US012708584B2

(12) United States Patent
Redmond

(10) Patent No.: US 12,708,584 B2
(45) Date of Patent: Aug. 18, 2026

(54) MUSCLE ACTIVATION ASSEMBLY SYSTEM AND METHOD

(71) Applicant: IQInvestments Corporation Pty Ltd, Wollongong (AU)

(72) Inventor: Geoffrey Redmond, Cronulla (AU)

(73) Assignee: IQINVESTMENTS CORPORATION PTY LTD, Wollongong (AU)

( * ) Notice: Subject to any disclaimer, the term of this patent is extended or adjusted under 35 U.S.C. 154(b) by 379 days.

(21) Appl. No.: 16/312,845

(22) PCT Filed: Mar. 7, 2017

(86) PCT No.: PCT/AU2017/050197
§ 371 (c)(1),
(2) Date: Dec. 21, 2018

(87) PCT Pub. No.: WO2017/219065
PCT Pub. Date: Dec. 28, 2017

(65) Prior Publication Data

US 2019/0343706 A1 Nov. 14, 2019

(30) Foreign Application Priority Data

Jun. 21, 2016 (AU) ................................ 2016902438

(51) Int. Cl.
*A61H 1/00* (2006.01)
*A63B 69/00* (2006.01)

(52) U.S. Cl.
CPC ............. *A61H 1/005* (2013.01); *A61H 1/001* (2013.01); *A63B 69/0057* (2013.01);
(Continued)

(58) Field of Classification Search
CPC .................... A61H 1/005; A61H 1/001; A61H 2201/0192; A61H 2201/1207;
(Continued)

(56) References Cited

U.S. PATENT DOCUMENTS

| | | | | |
|---|---|---|---|---|
| 2,827,894 A * | 3/1958 | Meyers | A61H 1/0266 601/31 |
| 3,276,777 A * | 10/1966 | Pruitt, Sr. | A63B 19/04 472/17 |

(Continued)

FOREIGN PATENT DOCUMENTS

| | | |
|---|---|---|
| DE | 19648346 C1 | 5/1998 |
| JP | S565554 U | 1/1981 |

(Continued)

OTHER PUBLICATIONS

Extended European Search Report; Application No. 17814310.3; Completed: Oct. 19, 2020; Issued: Oct. 29, 2020; 13 Pages.

(Continued)

*Primary Examiner* — Timothy A Stanis
*Assistant Examiner* — Christopher E Miller
(74) *Attorney, Agent, or Firm* — Whitmyer IP Group LLC

(57) ABSTRACT

A muscle activation system including: an inclined platform for a user to stand on; a rigid upper body user support frame attached to the inclined platform for supporting the upper body of the user standing on the inclined platform; a base, coupled to the inclined platform, the coupling allowing relative orientation motion between the base and inclined platform. The platform adapted to undergo a precession like motion around a central point so as to circumferentially move a user's upper body, when supported by the rigid upper body user support frame, substantially through an arc around a central point.

12 Claims, 28 Drawing Sheets

(52) U.S. Cl.
CPC ................ *A61H 2201/0192* (2013.01); *A61H 2201/1207* (2013.01); *A61H 2201/1623* (2013.01); *A61H 2201/1635* (2013.01); *A61H 2201/1661* (2013.01); *A61H 2203/0406* (2013.01)

(58) Field of Classification Search
CPC .... A61H 2201/1623; A61H 2201/1635; A61H 2201/1661; A61H 2203/0406; A63G 23/00; A63B 21/4039; A63B 21/4033; A63B 21/00069; A63B 21/4049; A63B 69/0057; A63B 2071/0081; A63B 24/0087; A63B 23/0216; A63B 2208/0204; A63B 2208/029; A63B 2220/18; A63B 2220/30; A63B 2225/09; A63B 2225/50; A63B 22/14; A63B 23/0205; A63B 21/068; A63B 21/0023; A63B 71/022; A63B 22/18; A63B 22/16; A63B 71/0622; A63B 2071/0072; A63B 2210/50; A63B 2225/093; F16B 7/14
USPC ............................................................ 601/23
See application file for complete search history.

(56) References Cited

U.S. PATENT DOCUMENTS

| | | | | | |
|---|---|---|---|---|---|
| 3,581,739 | A | 6/1971 | Brandt et al. | | |
| 3,936,047 | A * | 2/1976 | Brandt | A63G 31/00 | 482/130 |
| 4,113,250 | A * | 9/1978 | Davis | A61H 1/0218 | 472/16 |
| 4,509,743 | A | 4/1985 | Lie | | |
| 4,746,116 | A * | 5/1988 | Inada | A63B 19/04 | 482/145 |
| 4,861,023 | A | 8/1989 | Wedman | | |
| 5,547,460 | A * | 8/1996 | Ishikawa | A61H 1/00 | 482/146 |
| 5,582,567 | A | 12/1996 | Chang | | |
| 5,755,652 | A * | 5/1998 | Gardner | A63B 21/00178 | 482/146 |
| 5,879,276 | A * | 3/1999 | Miller | A63B 22/18 | 482/146 |
| 5,941,807 | A | 8/1999 | Cassidy et al. | | |
| 6,176,817 | B1 | 1/2001 | Carey et al. | | |
| 6,607,497 | B2 | 8/2003 | McLeod et al. | | |
| 7,374,522 | B2 * | 5/2008 | Arnold | A63B 21/005 | 482/146 |
| 7,465,253 | B2 | 12/2008 | Perry et al. | | |
| 7,645,221 | B1 | 1/2010 | Curry | | |
| 7,666,126 | B2 | 2/2010 | Rempe | | |
| 7,935,032 | B1 | 5/2011 | Jackson | | |
| 7,993,253 | B2 | 8/2011 | Fernandez | | |
| 8,529,418 | B2 | 9/2013 | Stewart et al. | | |
| 8,864,633 | B1 | 10/2014 | Butler et al. | | |
| 8,979,722 | B2 | 3/2015 | Klein et al. | | |
| 9,114,274 | B2 | 8/2015 | Kwon et al. | | |
| 9,415,287 | B2 | 8/2016 | Greiwe | | |
| 9,446,307 | B2 | 9/2016 | Klein et al. | | |
| 2003/0139268 | A1 * | 7/2003 | Chen | A63B 22/18 | 482/146 |
| 2003/0199374 | A1 * | 10/2003 | Perry | A63B 26/003 | 482/146 |
| 2004/0138028 | A1 * | 7/2004 | Hsieh | A63B 69/0093 | 482/51 |
| 2005/0148431 | A1 * | 7/2005 | Laserow | A63B 1/00 | 482/1 |
| 2007/0290632 | A1 * | 12/2007 | Stevens | B06B 1/045 | 318/135 |
| 2008/0161169 | A1 | 7/2008 | Chang et al. | | |
| 2010/0179459 | A1 * | 7/2010 | Koch | A61H 23/0263 | 601/53 |
| 2010/0222187 | A1 * | 9/2010 | Tudico | A63B 22/18 | 482/110 |
| 2010/0285941 | A1 * | 11/2010 | VanBuren | A63B 26/003 | 482/146 |
| 2011/0028290 | A1 * | 2/2011 | Ozawa | A63B 26/003 | 482/142 |
| 2011/0212814 | A1 * | 9/2011 | Gehris, Jr. | A61B 5/4023 | 482/142 |
| 2011/0312473 | A1 | 12/2011 | Chu et al. | | |
| 2012/0232442 | A1 * | 9/2012 | Wang | A61H 3/04 | 601/26 |
| 2013/0150220 | A1 | 6/2013 | Chen | | |
| 2013/0316885 | A1 | 11/2013 | Harwin | | |
| 2014/0179492 | A1 | 6/2014 | Wilkins | | |
| 2014/0256526 | A1 | 9/2014 | Henson | | |
| 2014/0287896 | A1 | 9/2014 | Kern et al. | | |
| 2014/0295394 | A1 * | 10/2014 | Weltha | A63B 22/18 | 434/258 |
| 2014/0371036 | A1 * | 12/2014 | Ellis | A63B 21/4033 | 482/66 |
| 2015/0051057 | A1 * | 2/2015 | Carter | A63B 21/4037 | 482/142 |
| 2015/0141223 | A1 | 5/2015 | Wood et al. | | |
| 2015/0305957 | A1 * | 10/2015 | Triplett | A61H 1/003 | 601/53 |
| 2017/0165519 | A1 * | 6/2017 | Hermanson | A63B 21/0023 | |
| 2017/0232323 | A1 * | 8/2017 | Shi | A63B 69/38 | 124/78 |
| 2019/0307982 | A1 * | 10/2019 | Brodsky | A61M 21/00 | |

FOREIGN PATENT DOCUMENTS

| | | | |
|---|---|---|---|
| KR | 20120051626 | A | 5/2012 |
| WO | 0061240 | A1 | 10/2000 |
| WO | 02076556 | A1 | 10/2002 |

OTHER PUBLICATIONS

Indian Office Action; Application No. 201937000350; Issued: May 3, 2021; 6 Pages.

International Preliminary Report on Patentability Application No. PCT/AU2017/050197 Issued: Aug. 16, 2018 19 pages.

* cited by examiner

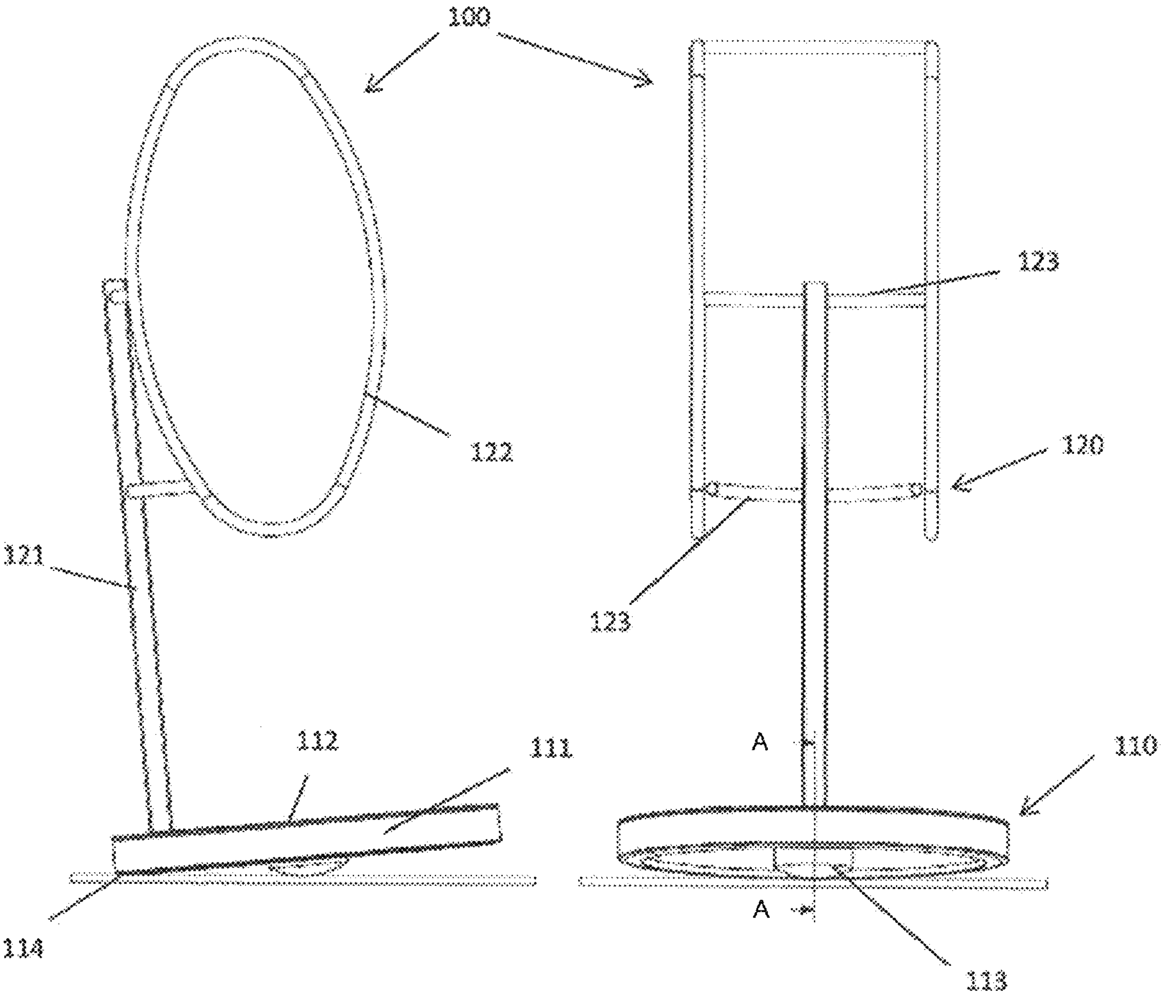
FIGURE 1
FIGURE 2
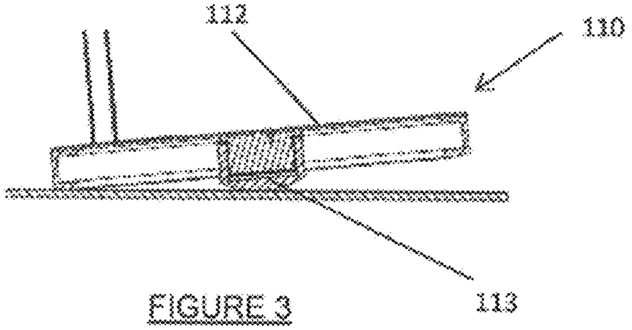
FIGURE 3

MUSCLE ACTIVATION ASSEMBLY SYSTEM AND METHOD

FIELD OF INVENTION

The present invention relates to a muscle activation assembly. More particularly the invention relates to an assembly that is adapted to activate muscles of the human body through gravitational forces. There is also provided associated methods of activating and conditioning muscles of the body.

BACKGROUND ART

Exercise machines and assemblies for activating muscles of the human body are known. Resistance training (also called strength training or weight training) is the one of the most common forms of muscular training which employs the use of resistance to muscular contraction to build the strength, anaerobic endurance and size of skeletal muscles. Resistance training is based on the principle that muscles of the body will work to overcome a resistance force when they are required to do so. Exercise machines and assemblies that employ this form of training are generally provided with weights or resilient bands which provide the requisite resistance to counter movement by a user.

Passive exercise machines and assemblies are also known which do not involve the use of resistance. Such assemblies generally provide an external means for imparting force or movement to the relevant body part. For example, such assemblies may impart oscillating motion or electrical impulses to the body part.

The present invention aims to provide an alternative assembly that employs gravity to impart forces on the human body. By imparting forces due to gravity, the invention activates the user's core muscles and key back muscles.

The potential benefits of core strengthening/endurance training are well known, including but not limited to:

- Balance, Proprioception
- Improved sports performance
- Reduced injury rates
- Increase in spinal stability
- Improved posture
- Reduced Lower back pain There are a number of system in the prior art for the physical conditioning of the human body by the means of exercise movement that utilises gravitational effects on the body to advance the muscle state. Examples include U.S. Pat. No. 3,936,047 to Brandt et al. which discloses an axial rotation system having a variable degree of tilt and speed rotation. Other systems include U.S. Pat. No. 4,509,743 to Lie; U.S. Pat. No. 6,176,817 to Carey et al; U.S. Pat. No. 7,374,522 to Arnold; U.S. Pat. No. 7,993,253 to Fernandez; and U.S. Pat. No. 7,645,221 to Curry.

Often these machines produce sub-optimal results. The patient is required to stand on a platform and perhaps hold onto a stabilising bar whilst the platform undergoes irregular motion. In this manner the patient receives exercise benefits.

Any discussion of the background art throughout the specification should in no way be considered as an admission that such art is widely known or forms part of common general knowledge in the field.

SUMMARY OF INVENTION

As mentioned above, the present invention relates generally to a muscle activation assembly that is adapted to activate muscles of the human body through gravitational forces. Activation of the muscles of a user may be conscious or subconscious.

In accordance with a first aspect of the present invention, there is provided a muscle activation system including: an inclined platform for a user to stand on; a rigid upper body user support frame attached to the inclined platform for supporting the upper body of a user standing on the inclined platform; a base, coupled to the inclined platform, the coupling allowing relative orientation motion between the base and inclined platform. The platform can be adapted to undergo a precession like motion around a central point so as to circumferentially move a user's upper body, when supported by the rigid upper body user support frame, substantially through an arc around a central point.

In some embodiments, the base can be coupled to the inclined platform by a universal joint. The inclined platform preferably can include a circumferential rim which engages with the base as the platform undergoes the precession like motion. Preferably, during operation, the platform can be substantially supported by the circumferential rim and the universal joint. The inclined platform can be substantially circular in circumference. In some embodiments, the platform can be generally planar and a normal axis to the platform undergoes rotation around a central point.

The rigid upper body user support frame can be of a cage like structure having a plurality of hand holds for the user to hold onto during operation. The support frame further preferably can include lower arm holds for structurally supporting the users lower arms. The support frame preferably can include a padded back support.

In some embodiments, there is provided an automated platform driving means for driving the platform through its motion. The automated platform driving means can comprise an electric motor interconnected to a rotational plate having a series of circumferential bearings which engage with the platform to drive the motion of the platform.

In the embodiments, the head and body travel a circumference off their centre of gravity, facing a constant direction, to activate the body's natural gravity reactive systems to potentially strengthen and heal itself. The machine provides the motion to allow this process to take place.

To make safe the person may be supported or fixed on the motion platform by the feet, (snow boots) legs, (straps) waist (belt) or hands (grip frame) depending on the exercise focus.

In some embodiments, the existing frames are rigid and fixed to the motion platform. In some alternative embodiments, there will be incarnations where the hands grip the frame that will be able to move in a different programmed fashion in conjunction with the motion platform to give further dimensions to the variables that the machine can offer.

In accordance with another aspect of the present invention, there is provided a muscle activation system including: a platform for a user to stand on; a support base for supporting the platform; a flexible coupler, coupling the platform to said support base, said coupling allowing relative orientation motion between the base and inclined platform; a first electric drive unit located between the platform and support base, said drive unit including at least one engagement unit for engaging with the bottom surface of the platform and a corresponding surface of the support base to keep them at a predetermined orientation apart from one another, whilst the engagement unit rotates around the flexible coupler.

In some embodiments, the at least one engagement unit includes a first bearing engaging the bottom surface of the platform and a second bearing engaging the support base, with the first and second bearing being rigidly interconnected. The system can further comprise a flexible coupler elevation unit, for raising and lowering the vertical position of the flexible coupler. In some embodiments, the flexible coupler elevation unit comprises a worm drive. In some embodiments, the flexible coupler comprises a universal joint. In some embodiments, the number of engagement units is at least two, with each engagement unit engaging an outer portion of the bottom platform surface. In some embodiments, the first electric drive unit engages with a bottom surface of the platform so as to elevate or incline a portion of the platform relative to is surrounds. In some embodiments, the at least one engagement unit, engages a lip on the bottom of the platform to push it down.

According to further aspects of the invention there is provided a muscle activation assembly comprising:

- a base adapted to tilt about a substantially central point in 360° of motion;
- a support associated with the base and adapted to support a user of the muscle activation assembly;
- wherein, in use, a user of the muscle activation assembly is in a substantially static position relative to the base and is tilted about 360° of motion, or part thereof, thereby imparting forces on the body of the user.

The form of the base is not particularly limited provided this is tiltable about 360° of motion (i.e. in a horizontal plane). In one embodiment, the base comprises a base plate, for example a substantially circular base plate, mounted to tilt about 360° of motion. The user, during operation of the assembly, maintains the same orientation throughout the base plate tilting.

In certain embodiments, the base plate is tiltable at an angle of from 0° to 25° to the horizontal, for example 2° to 18°, 5° to 15°, 2° to 20°, 5° to 20° to the horizontal. It will be appreciated that the greater the degree of tilt, the more strenuous the muscle activation.

The base plate may be tiltably mounted on a mount comprising a substantially central universal joint and a plurality of rollers which bear on a running surface of an outer portion of said base plate. Alternatively, an outer underside portion of the base plate may bear on the plurality of rollers. In certain embodiments at least 2 linear actuators mounted to the periphery of the base plate may be provided to facilitate tilting motion. Advantageously, either orbital or linear motion of the base plate can be achieved. An example would be either tilting “fore and aft” or “side to side” to promote muscle activation by the user.

If desired, the central universal joint and/or said rollers may be associated with a drive. It is envisaged that this may be particularly useful in situation where a user of the muscle activation assembly has limited strength or movement capability. Furthermore, in certain embodiments the assembly may comprise a height adjustment mechanism, for example a threaded jack, adapted to raise and lower the base plate thereby varying the degree of tilt of the base plate, the variation being random or controlled. The internal thread jack may raise and lower the outer roller support rim while the universal joint remains in a fixed position, or may raise and lower the universal joint while the outer roller support rim remains fixed.

In an alternate embodiment, the base plate comprises a substantially central fixed pivot and, in use, an outer perimeter of the base plate bears a surface on which said muscle activation assembly rests. According to this embodiment, the fixed pivot may be height adjustable to facilitate adjustment of the tilt angle of the base.

The support may take any suitable form, provided that this is adapted to locate the user in a suitable position relative to the base and support the user in a static position. For example, it is considered that the support may be adapted to maintain the user in a seated or lying static position. However, in a preferred embodiment the support is adapted to maintain the user in an upright static position.

According to one embodiment, the support comprises a frame extending from the base, the frame comprising a body support and at least one handle. In use, a user positions themself on the body support and grasps the at least one handle. In one embodiment the body support of the frame comprises an upright extending from said base. The upright may comprise padding that receives the back or chest of a user of the muscle activation assembly. It will be appreciated, though, that more than one upright may be provided and a crossbar, optionally with padding, be provided extending between the uprights to support the back or chest of the user. The upright is generally disposed towards and outer edge of the base, but advantageously positions the user such that the user is axially aligned with the central vertical axis of the assembly (i.e. as determined by the pivot point of the base). Preferably the upright is height adjustable. This renders the muscle activation assembly suitable for use by users of varying height.

It is envisaged that the frame may include a single handle, for example extending horizontally and spaced away from the body support. In this embodiment, the handle may be grasped by both hands of a user. However, in a preferred embodiment, the at least one handle of the frame comprises two handles associated with the body support and adapted to be held by a user of the muscle activation assembly. For example, the handles may comprise substantially elliptical sub-frames associated with the body support and extending outwardly therefrom over the base. In certain embodiments the handles may be adjustable to accommodate users of differing height and arm reach.

The muscle activation assembly may be suitable for use on athletes to the infirm. As such, a number of different support systems can be employed. One example thought suitable for use by athletes comprises a strap system that safely retains the user at approximately the thigh region to maximise muscle activation in the core and back. One or more hand grip(s) may be provided with sensors in this embodiment. The handgrips may provide a safety support mechanism only, and may not be intended for use while the assembly is operating. The handgrips may provide a “smart” function to a control system that will reduce the intensity when gripped by the user. An algorithm may control the tilting, inclination and speed of change of same during operation so that the assembly may ramp up intensity in a pre-determined way, or randomly. Direction of rotation direction may also be adjusted as desired.

In that regard, the muscle activation system may further generally comprise a control system provided with software that controls the tilting, inclination and speed of change of same during operation so that the assembly may ramp up intensity in a pre-determined way, or randomly. The system may generally further comprise one or more sensors adapted to communicate information to the control system.

The muscle activation assembly may further comprise a seat associated with the body support, the seat preferably being foldable into a non-use position. This may be particularly useful in situations where a user suffers from a disability, is recovering from an injury, or for a sedentary user that requires gradual reactivation of muscle groups. The assembly may be collapsible for easy storage.

According to another aspect of the invention there is provided a muscle activation method comprising:

locating a user, in a static position, on a support associated with a base adapted to tilt about a substantially central point in 360° of motion, and tilting the base about 360° of motion, or part thereof, thereby imparting forces on the user while maintaining the static position of the user.

Consistent with the above discussion of the muscle activation assembly of the invention, tilting is preferably conducted at an angle of up to 25° to the horizontal, for example 2° to 18°, 5° to 15°, 2° to 20°, 5° to 20° to the horizontal. The method may further comprise varying the degree of tilt of the base, the variation being random or controlled.

It is envisaged that the method may be suitable for conditioning of the multifidus muscle.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the appended drawings. It should be appreciated that these drawings depict only typical embodiments of the invention and are therefore not to be considered limiting on its scope. The invention will be described and explained with additional specificity and detail through the accompanying drawings in which:

FIG. 1 illustrates a side view of a muscle activation assembly according an embodiment of the invention.

FIG. 2 illustrates a front view of the muscle activation assembly of FIG. 1.

FIG. 3 illustrates a sectional view (A-A) of the base of the muscle activation assembly of FIG. 1.

DETAILED DESCRIPTION OF THE PREFERRED EMBODIMENTS

Figure 4:
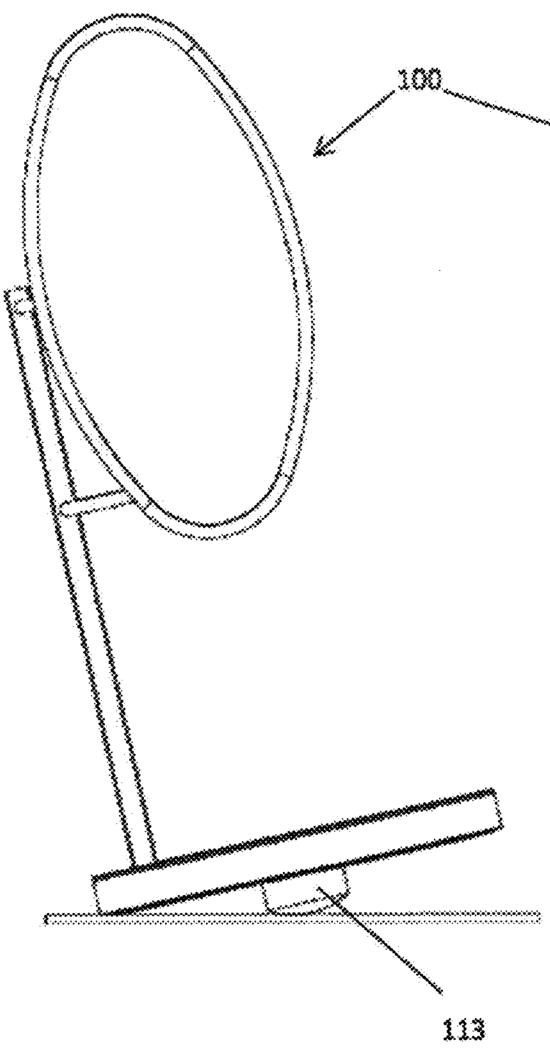
FIG. 4 illustrates a side view of a muscle activation assembly of FIG. 1 in an alternate orientation.

Hereinafter, this specification will describe the present invention according to the embodiments. It is to be understood that limiting the description to the embodiments of the invention is merely to facilitate discussion of the present invention and it is envisioned without departing from the scope of the appended claims.

Referring to FIGS. 1 to 3, a muscle activation assembly 100 is illustrated. The assembly 100 includes a base 110 and a frame 120 connected thereto. According to this embodiment; the base 110 includes a base plate 111 having an upper surface 112 on which a user of the assembly 100 stands, generally in an upright position. The base 110 also includes a fixed pivot 113 that is centrally located on an under side of the base plate 111. As illustrated in FIGS. 1 to 3, the pivot 113 extends to provide a tilt angle of about 6° from the horizontal when the outer perimeter 114 of the base plate 111 bears on the surface on which the assembly 100 rests.

The frame 120 illustrated in this embodiment includes an upright 121, which in use supports the back or chest of a user, and two spaced generally elliptical handles 122. The elliptical handles 122 are shaped such that a user can grasp them at any location, to some extent depending on the muscles to be activated. Struts 123 are provided to connect the elliptical handles 122 to the upright 121.

Figure 5:
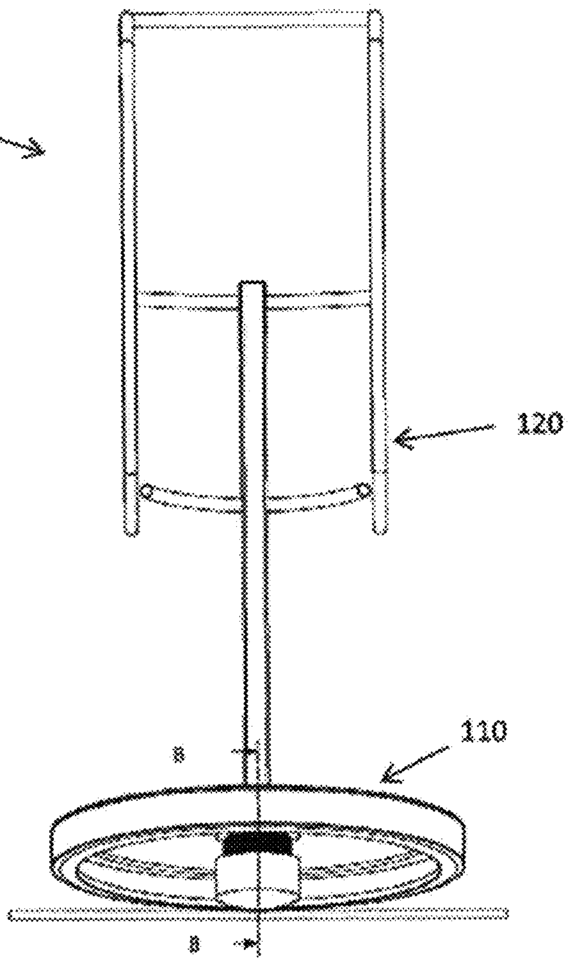
FIG. 5 illustrates a front view of the muscle activation assembly of FIG. 4.
Figure 6:
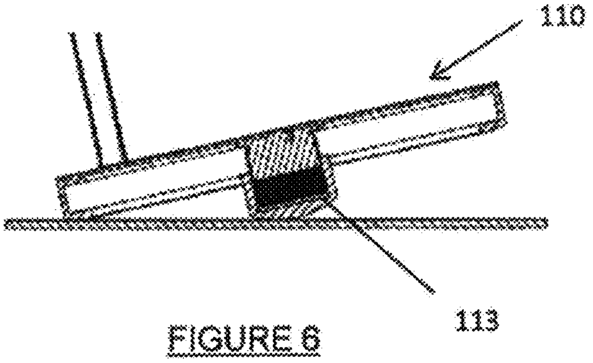
FIG. 6 illustrates a sectional view (B-B) of the base of the muscle activation assembly of FIG. 4.

Referring to FIGS. 4 to 6, the assembly of FIGS. 1 to 3 is again illustrated, but in this instance the fixed pivot 113 is in an extended orientation. The orientation of the pivot 113 illustrated provides in a tilt angle of about 12° from the horizontal, which results in a more strenuous session for a user of the assembly 100.

Figure 7:
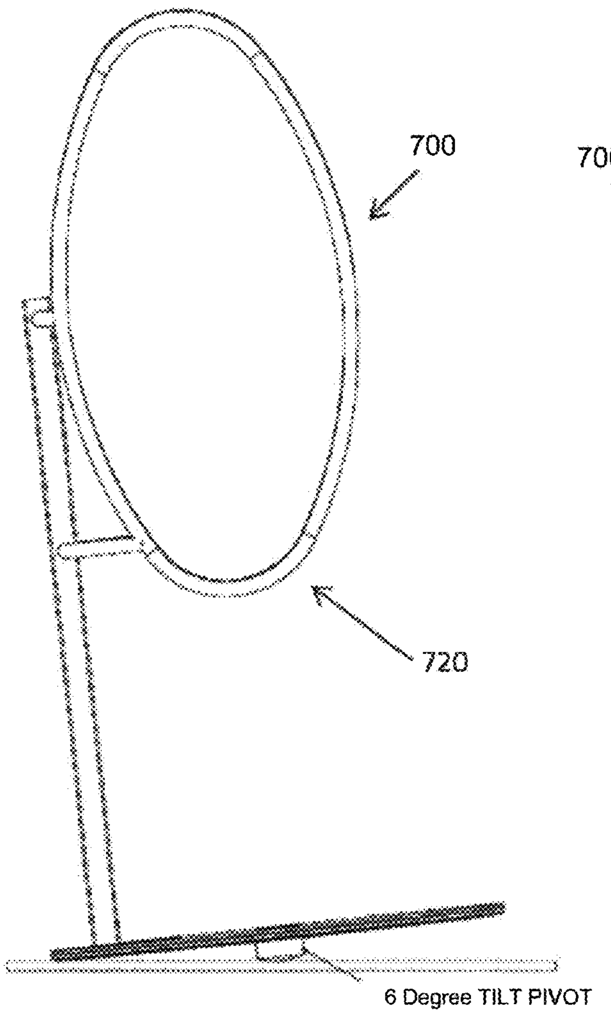
FIG. 7 illustrates a side view of a muscle activation assembly according to an embodiment of the invention, including various tilt pivots.
Figure 8:
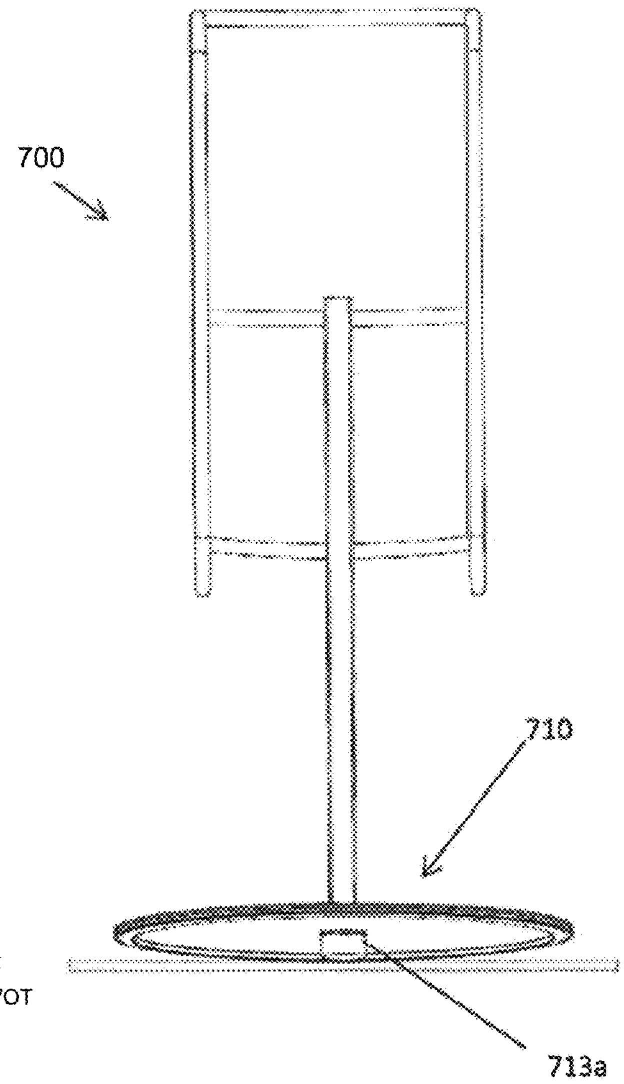
FIG. 8 illustrates a front view of the muscle activation assembly of FIG. 7.
Figures 9, 10:
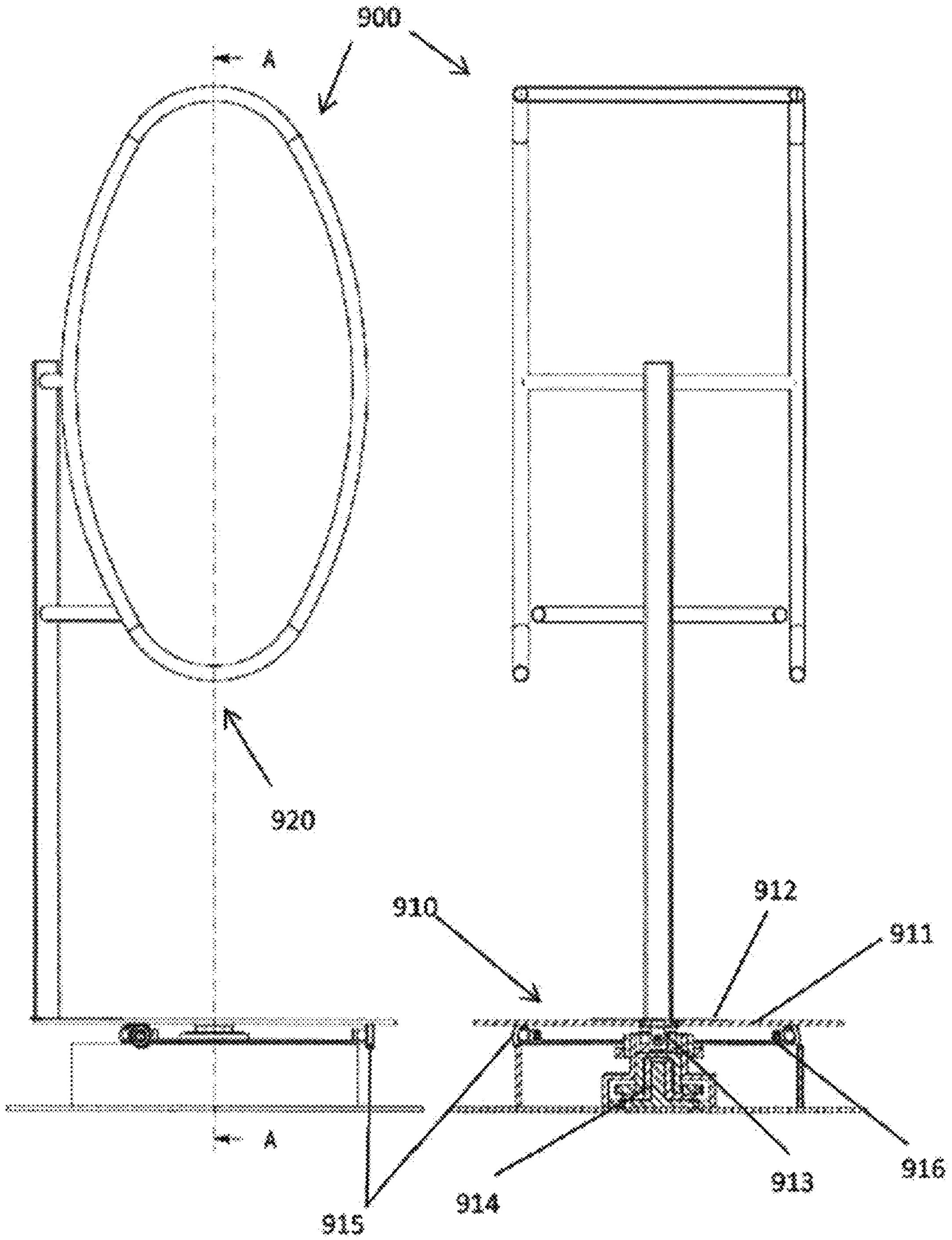
FIG. 9 illustrates a side view of a muscle activation assembly according to an embodiment of the invention, including a universal joint pivot assembly.
FIG. 10 illustrates a sectional view (A-A) of the muscle activation assembly of FIG. 9.
Figure 11:
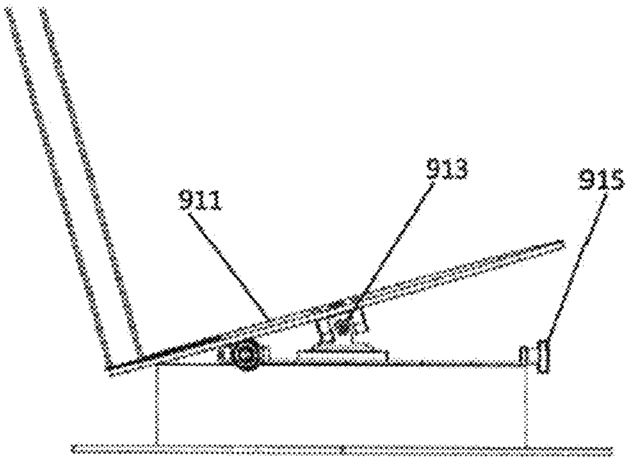
FIG. 11 illustrates a side view of the base of the muscle activation assembly of FIG. 9.
Figure 12:
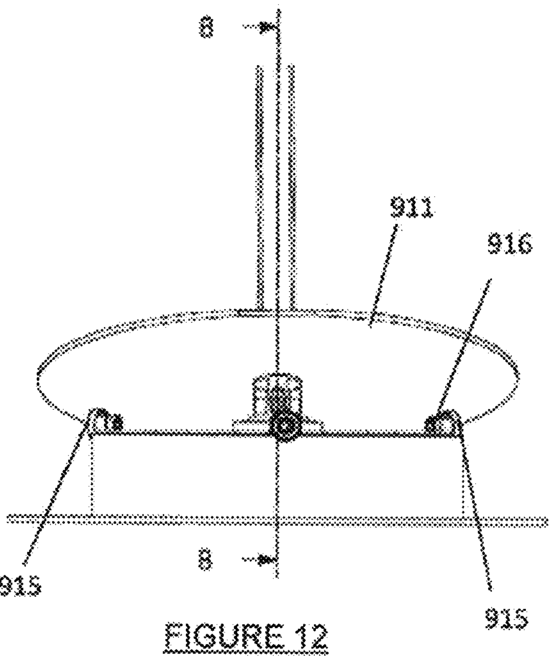
FIG. 12 illustrates front view of the base of the muscle activation assembly of FIG. 9.
Figure 13:
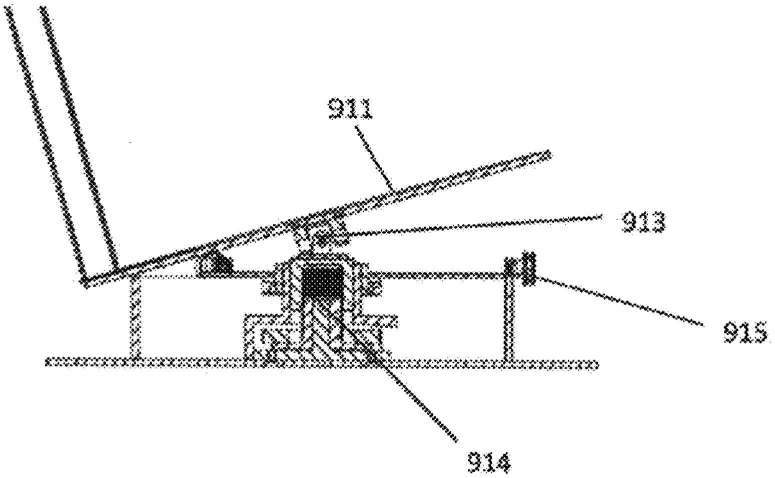
FIG. 13 illustrates a sectional view (B-B) of the base of FIG. 12.

FIGS. 7 and 8 provide side and front views of a muscle activation assembly 700 that, again, includes a base 710 and a frame 720. In this instance, the pivot 713*a-c* is adaptable to provide a 6° tilt (713*a*), 9° tilt (713*b*) and 12° tilt (713*c*).

FIGS. 9 to 13 illustrate an alternative embodiment of a muscle activation assembly 900 according to the invention. In this embodiment, the assembly 900 includes a base 910 that is mechanised. Specifically, the base 910 includes a base plate 911 having an upper surface 912. The base 911 is mounted on a central universal joint 913 that replaces the fixed pivot of the previous embodiments. The universal joint 913 is associated with a jack 914, in this embodiment a threaded jack, which is adapted to raise and lower the base plate 911.

A plurality of rollers 915 is provided. The rollers in this embodiment bear on an outer circumferential portion of the underside of the base plate 911. However, in a preferred embodiment the base plate 911 includes a track (not shown) that depends from the circumferential edge of the base plate 911. The track, which is substantially U-shaped, receives the rollers 915 such that the rollers 915 are always closely associated with the base plate 911. Each of the rollers 915 is associated with a secondary roller 916.

Figures 14, 15:
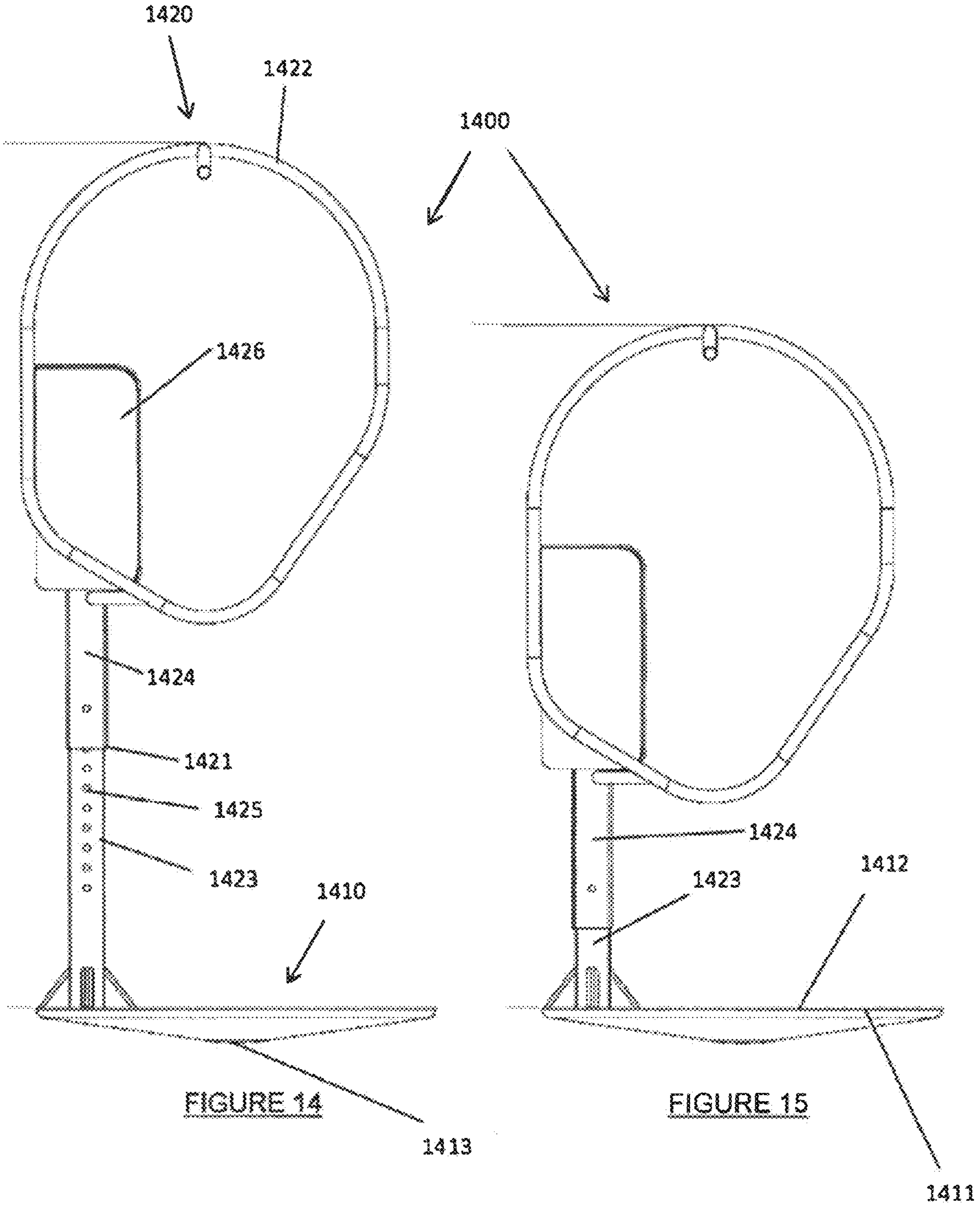
FIG. 14 illustrates a side view of a muscle activation assembly according to an embodiment of the invention in an extended orientation.
FIG. 15 illustrates a side view of the muscle activation assembly of FIG. 14 in a retracted orientation.
Figure 16:
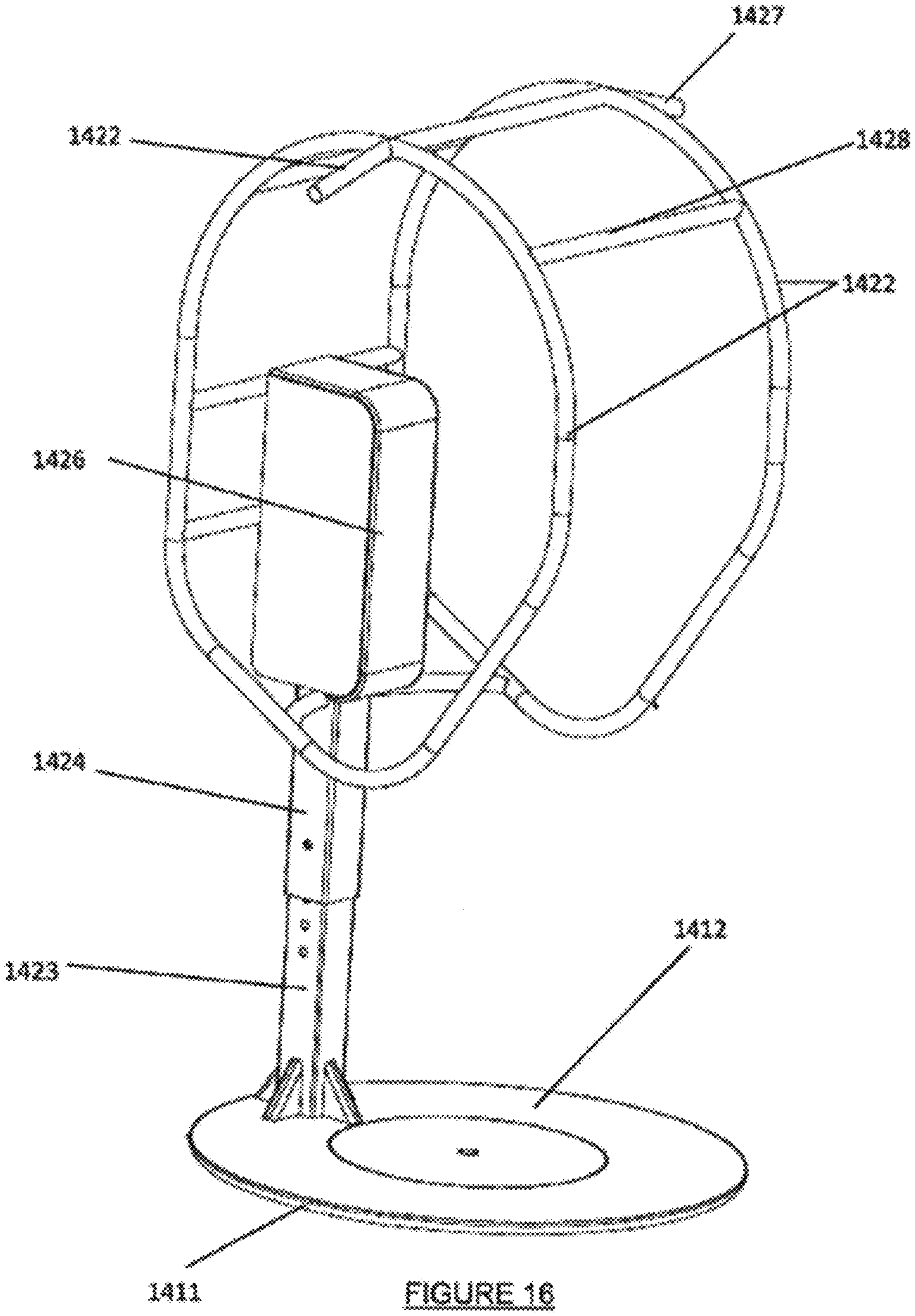
FIG. 16 illustrates a perspective view of the muscle activation assembly of FIG. 14.

Referring to FIGS. 14 to 16, an alternate embodiment of a muscle activation assembly 1400 is illustrated. In this embodiment, the base 1410 is a substantially circular base plate 1411 having an upper surface 1412 and a fixed pivot 1413. It will be appreciated that the base configuration may be interchanged with any previously described configuration.

In this embodiment, the frame 1420 includes an upright 1421 and two elliptical handles 1422. The upright 1421 is adjustable between an extracted orientation (FIG. 14) and a retracted orientation (FIG. 15) by virtue of inner and outer telescopic parts 1423, 1424 respectively. A plurality of apertures 1425 are provided to facilitate locking of the upright using, for example, a pin. A back/chest rest 1426 is provided. A user may stand with his or her back or chest against the rest 1426, depending on the muscles to be primarily activated. The rest 1426 is positioned such that when a user of the assembly 1400 bears their chest or back against the rest 1426, their body is substantially axially aligned with the pivot 1413.

The frame 1420 may be gripped by a user at any location about the substantially elliptical handles 1422. Additional handles 1427 are also provided if desired. Furthermore, crossbars 1428 may also be provided as additional holding points for the user.

Figure 17:
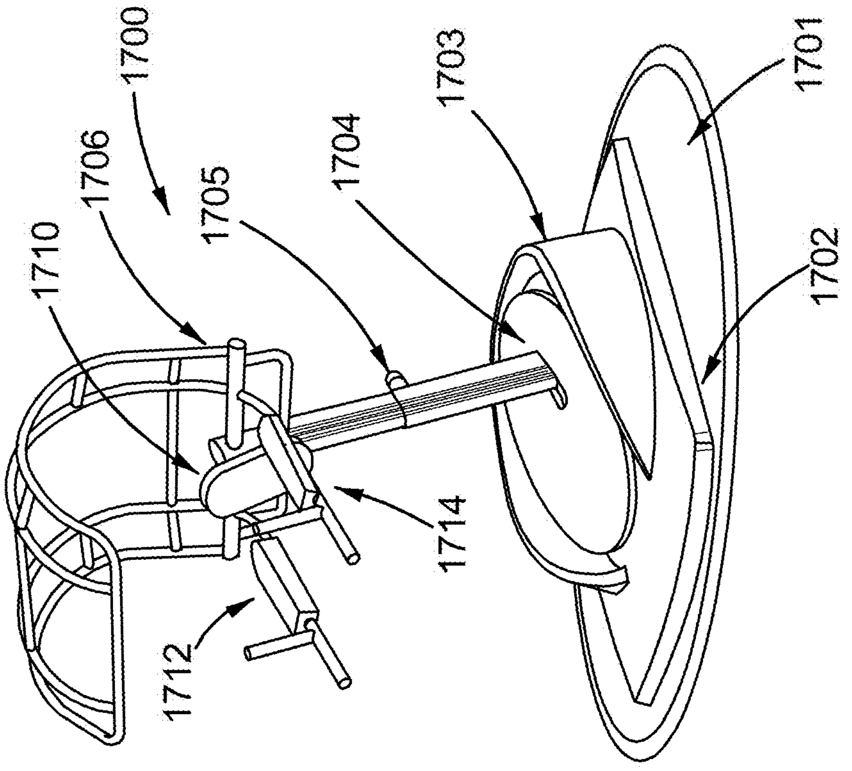
FIG. 17 illustrates a side perspective view of a further muscle activation assembly in a first position.

Turning to FIG. 17, there is illustrates a further embodiment 1700. The embodiment is mounted on a safety mat 1701, and includes a steel chassis assembly 1702 (not shown) under base moulding assembly 1703. A platform composite assembly for standing on is provided 1704. An upper space frame assembly 1706 is attached to the platform via a stem assembly 1705. The upper space frame includes back support structure 1710 and arm support structures 1712 and 1714. The space frame assembly provides support for a user and is designed to rotate around a central pivot point.

Figure 18:
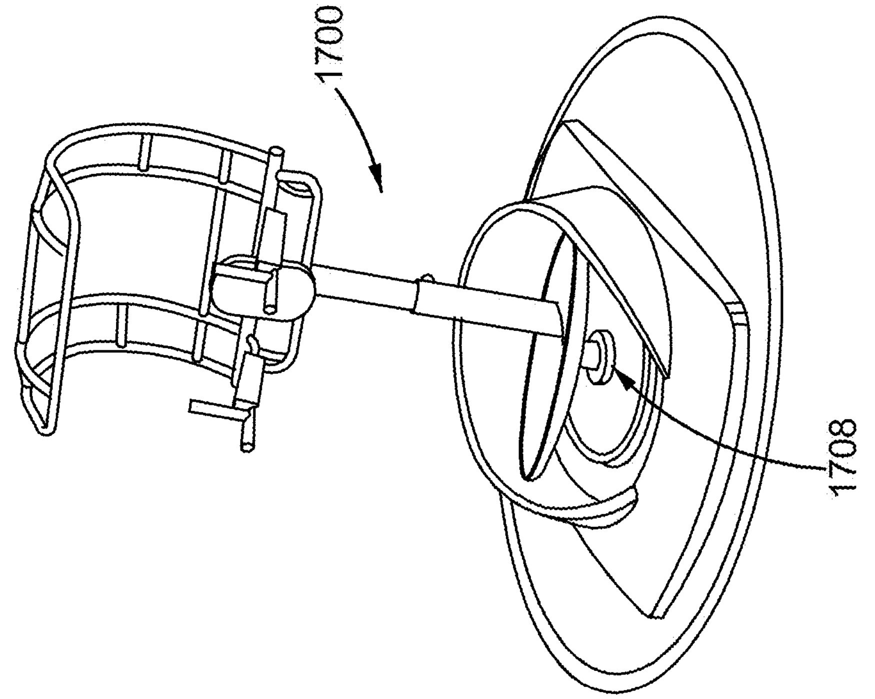
FIG. 18 illustrates a side perspective view of a further muscle activation assembly in a second position.

FIG. 18 reveals the embodiment in a different position revealing the attachment universal joint 1708 around which platform 1704 pivots and upper frame undergoes a precession like motion.

Figure 19:
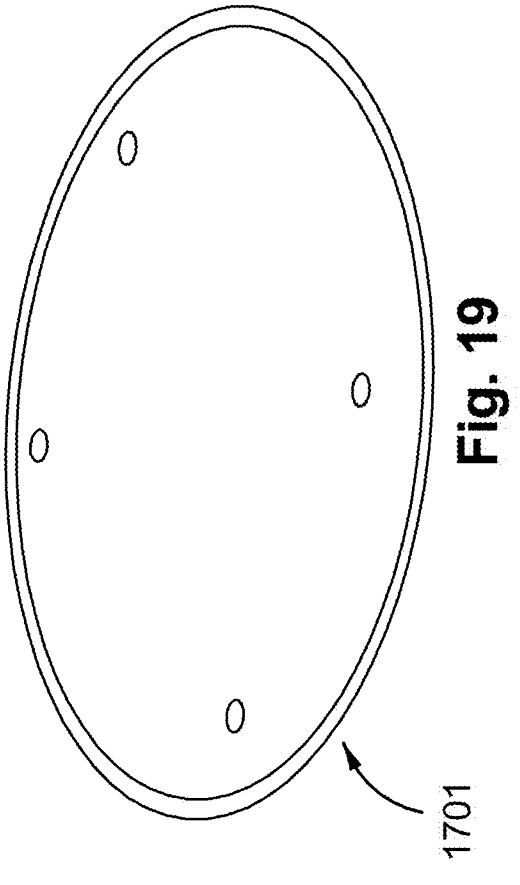
FIG. 19 illustrates a side perspective model of the base mat.
Figure 20:
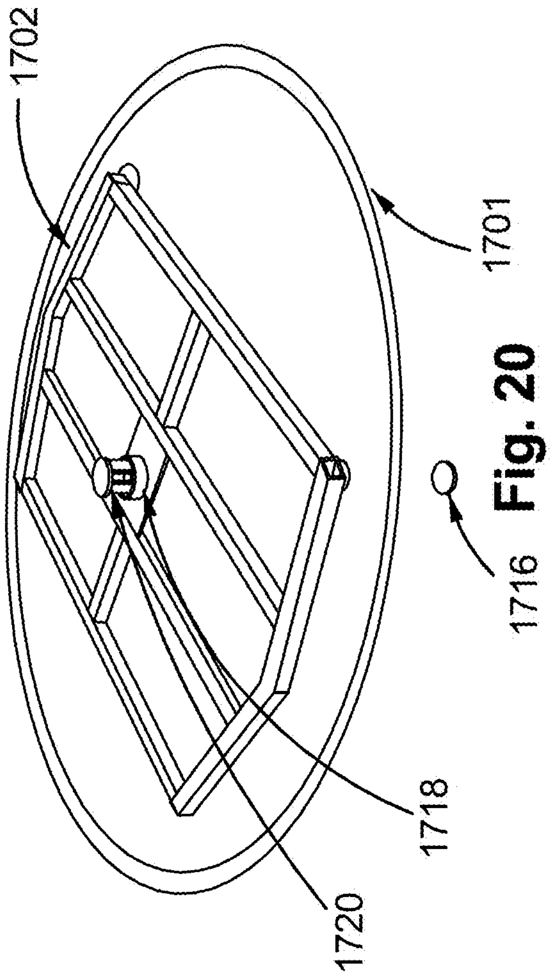
FIG. 20 illustrates a side perspective view of base mat and steel frame.

The construction of the arrangement 1700 will now be discussed. Initially, as illustrated in FIG. 19, a safety matt 1701 is formed as an optional floor base. Turning to FIG. 20, on top of the matt is places a steel chassis frame 1702. The frame can be levelled by a series of optional spacing discs 1716. On the chassis 1702 is bolted a spacer 1718 and a universal joint 1720. The arrangement can be bolted using joint bolts.

Figure 21:
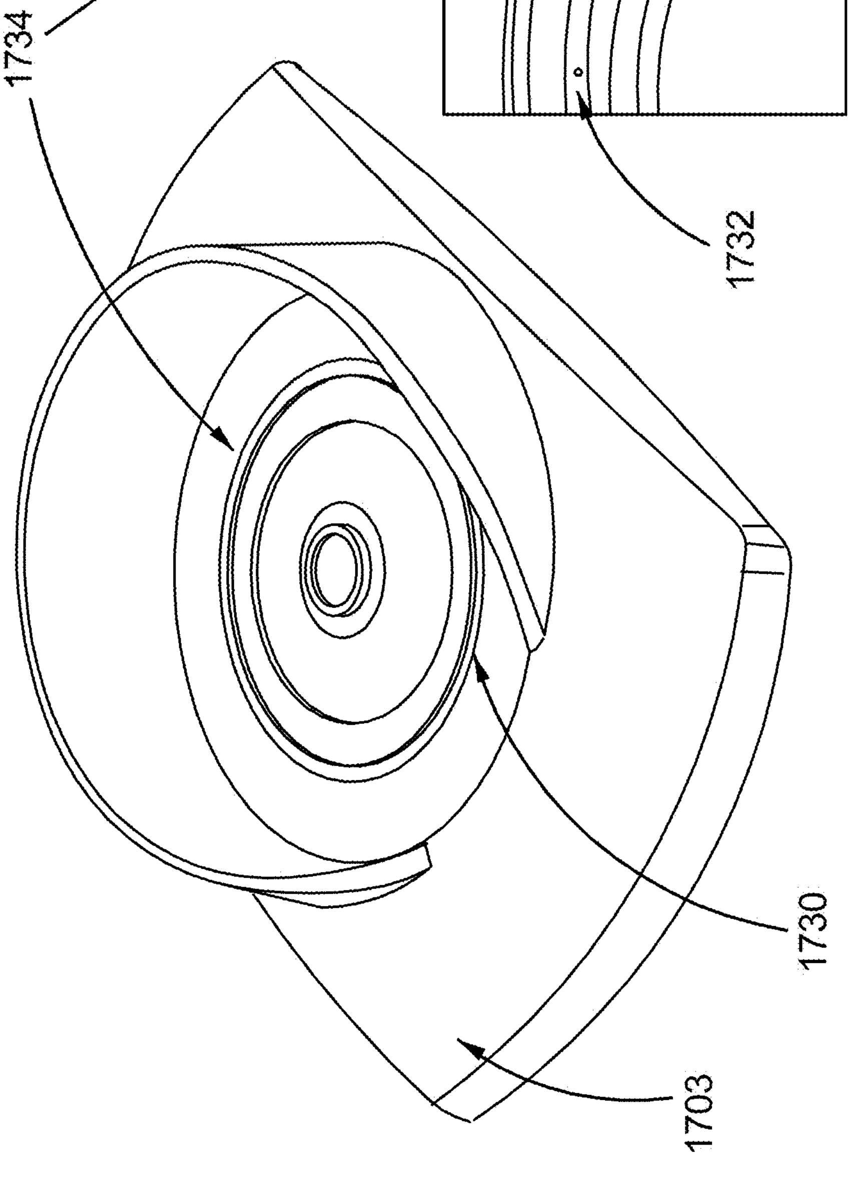
FIG. 21 illustrates a side perspective view of the base moulding.

Turning to FIG. 21, the base moulding 1703 is next mounted over the steel frame. The base moulding includes a base slip ring 1730 by means of a series of M6 screws in holes in the base.

Figure 21A:
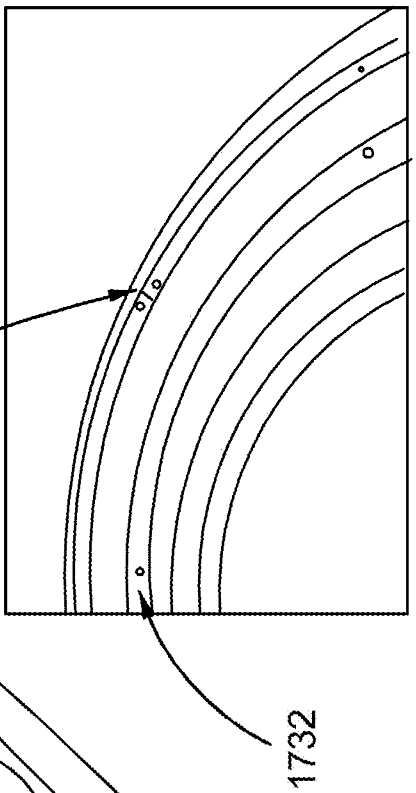

FIG. 21*a* shows an insert having the base holes 1732, 1734 for mounting.

Figure 23:
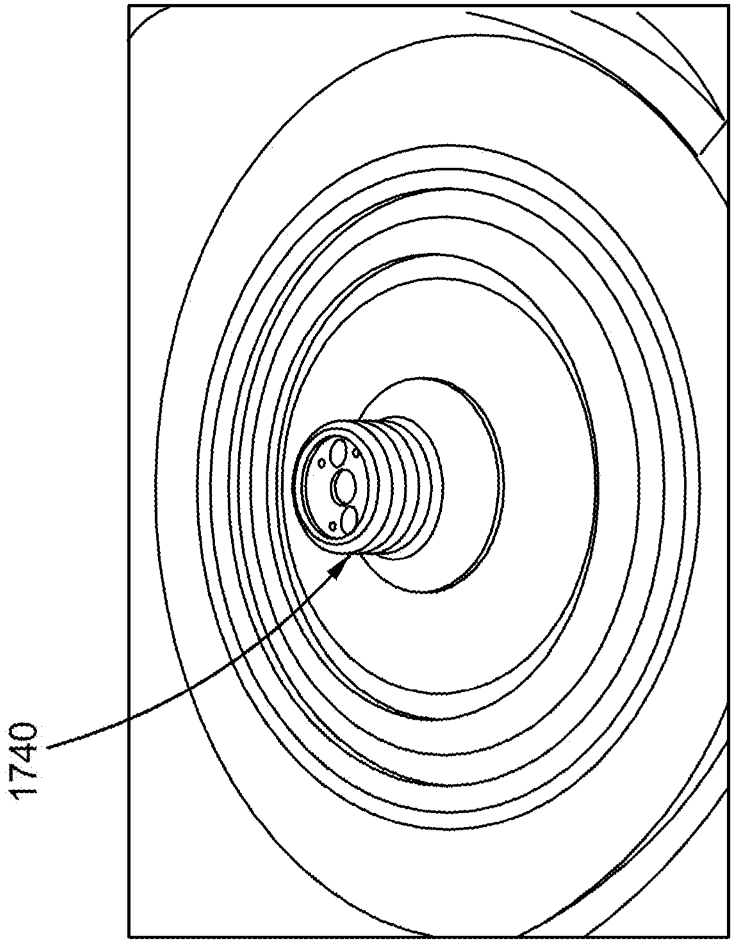
FIG. 23 illustrates a close up of a portion of FIG. 23.
Figure 22:
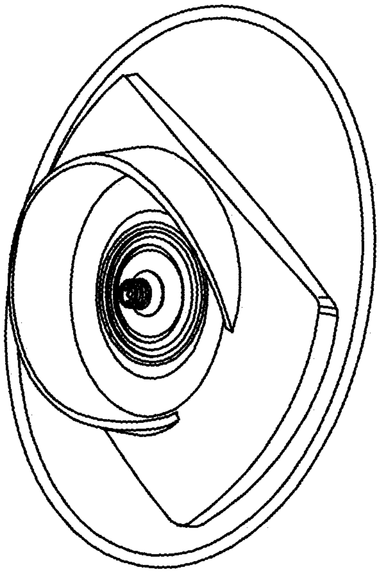
FIG. 22 illustrates a side perspective view of the base moulding and matt.

FIG. 22 shows the partially assembled arrangement, with FIG. 23 showing a closeup of the universal joint with a boot covering. The base moulding 1703 being firmly attached to the chassis by means of threaded screws.

Figure 25:
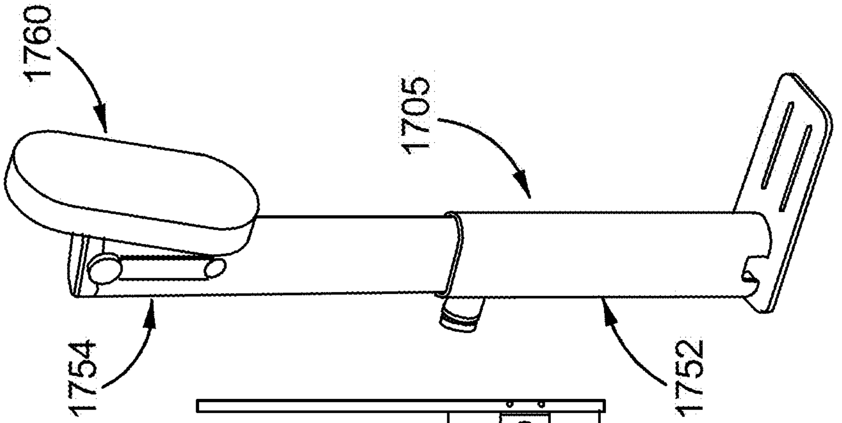
FIG. 25 illustrates a side perspective view of the stem assembly.
Figure 24:
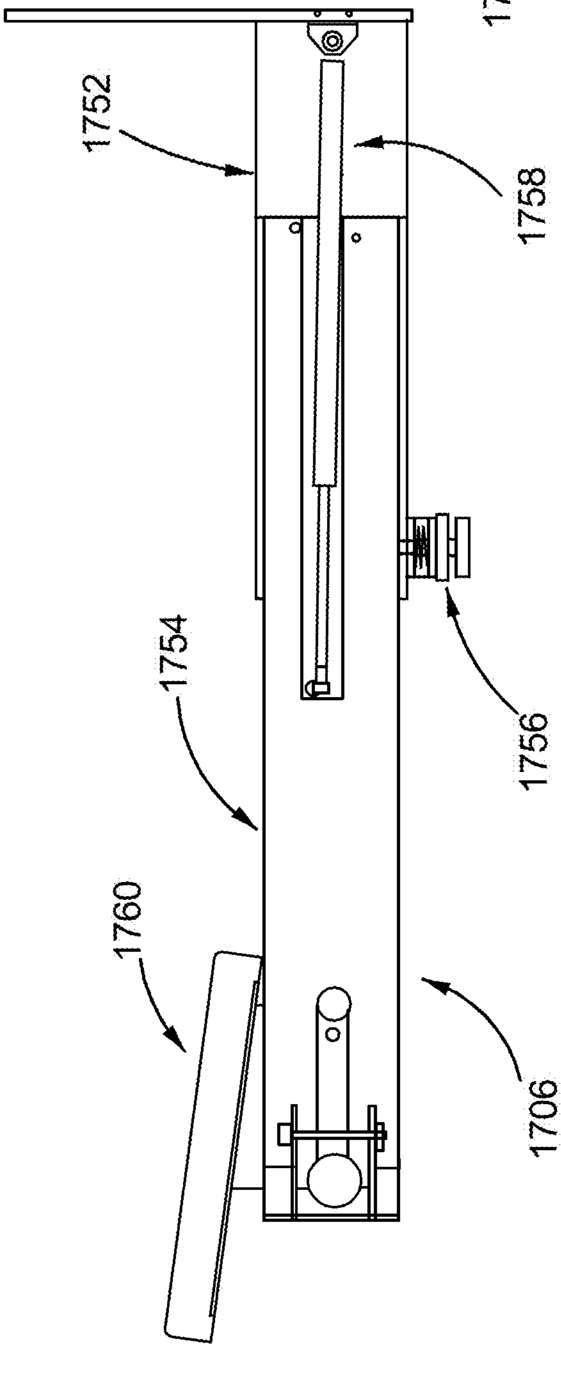
FIG. 24 illustrates a side plan view, partly in section, of the stem assembly.

Next, the stem assembly 1705 of FIG. 17 is assembled. FIG. 24, illustrates a side view, partly in section of the stem assembly, with FIG. 25 showing a further side perspective view.

The stem assembly is formed from two major columns, being the base extrusion assembly 1752 and top extrusion assembly 1754 which mate together in a telescopic structure to provide adjustable height characteristics. The adjustment is provided by control knob and dampener 1758.

Figure 27:
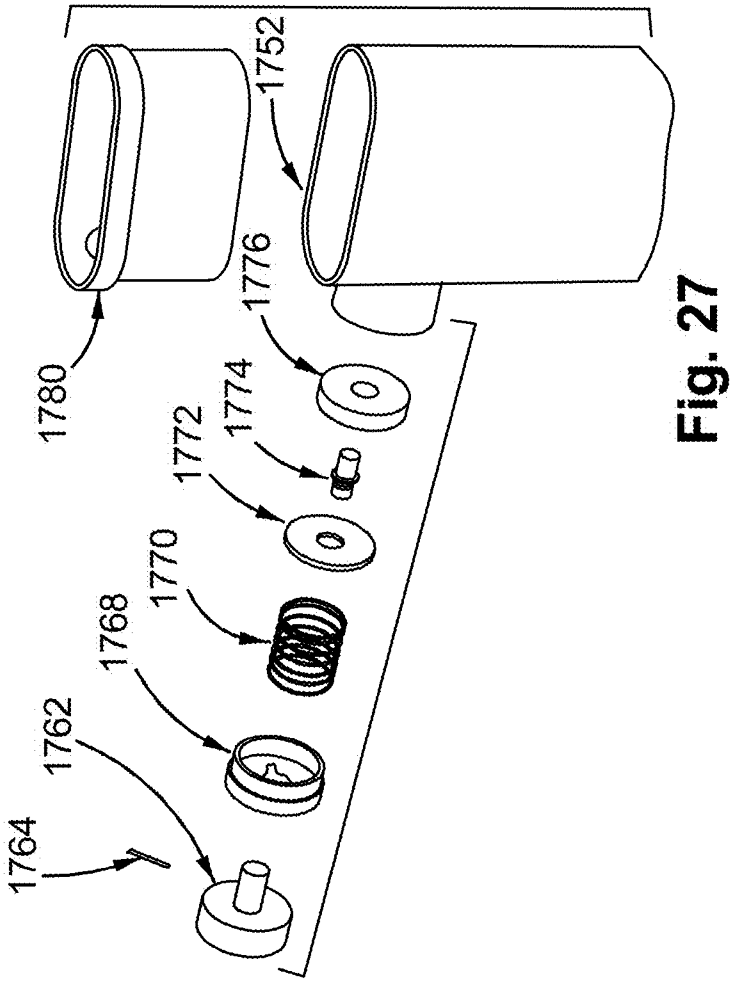
FIG. 27 illustrates an exploded perspective of the top of the base assembly.
Figure 26:
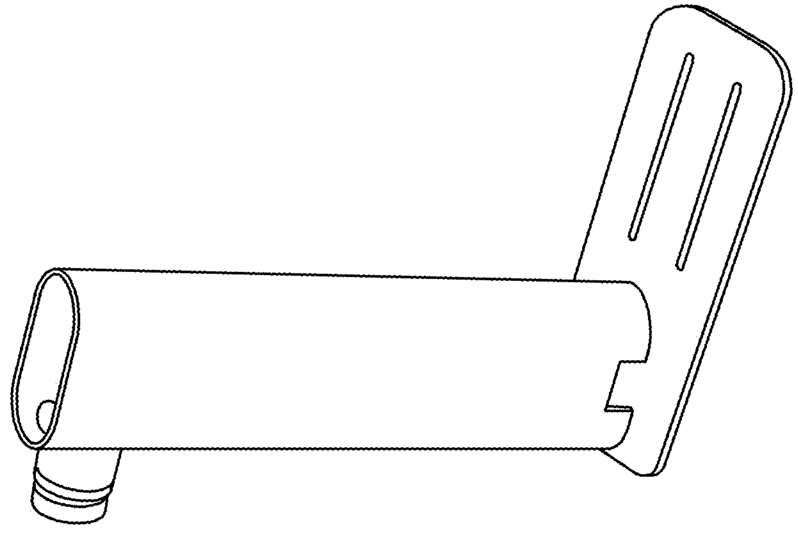
FIG. 26 illustrates a side perspective view of the base assembly.

FIG. 27 illustrates the assembly of the control knob. The control knob is designed to lock the top extrusion assembly to the base extrusion assembly.

Figure 29:
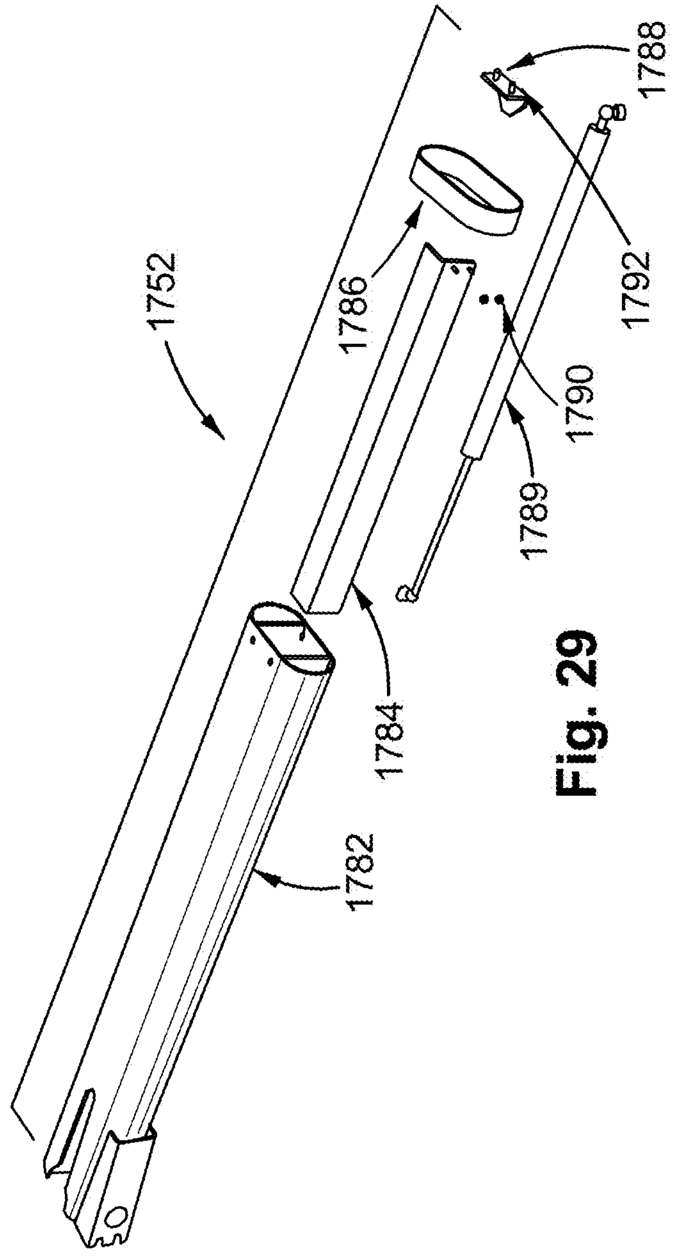
FIG. 29 illustrates an exploded perspective view of the top assembly.
Figure 28:
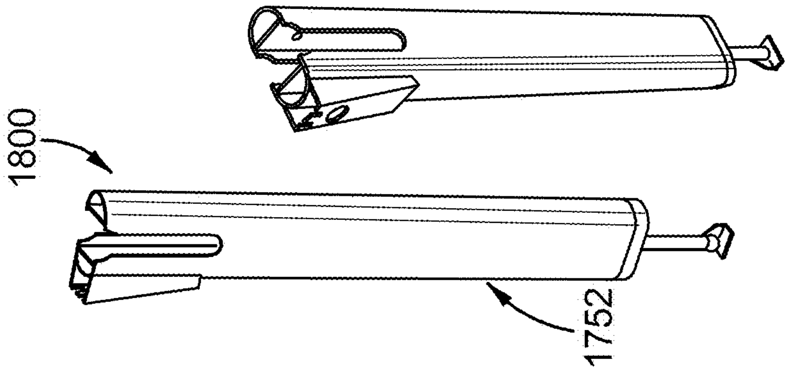
FIG. 28 illustrates a side perspective view of the top assembly.

FIG. 28 shows the top extrusion assembly in an assembled form. FIG. 29 shows the top extrusion assembly in an exploded perspective form. Turning to FIG. 29 the top extrusion assembly includes extruded stem 1782, support structure 1784, collar 1786, telescopic dampener rod 1789 and fixing bolts 1792, 1790.

Figure 31:
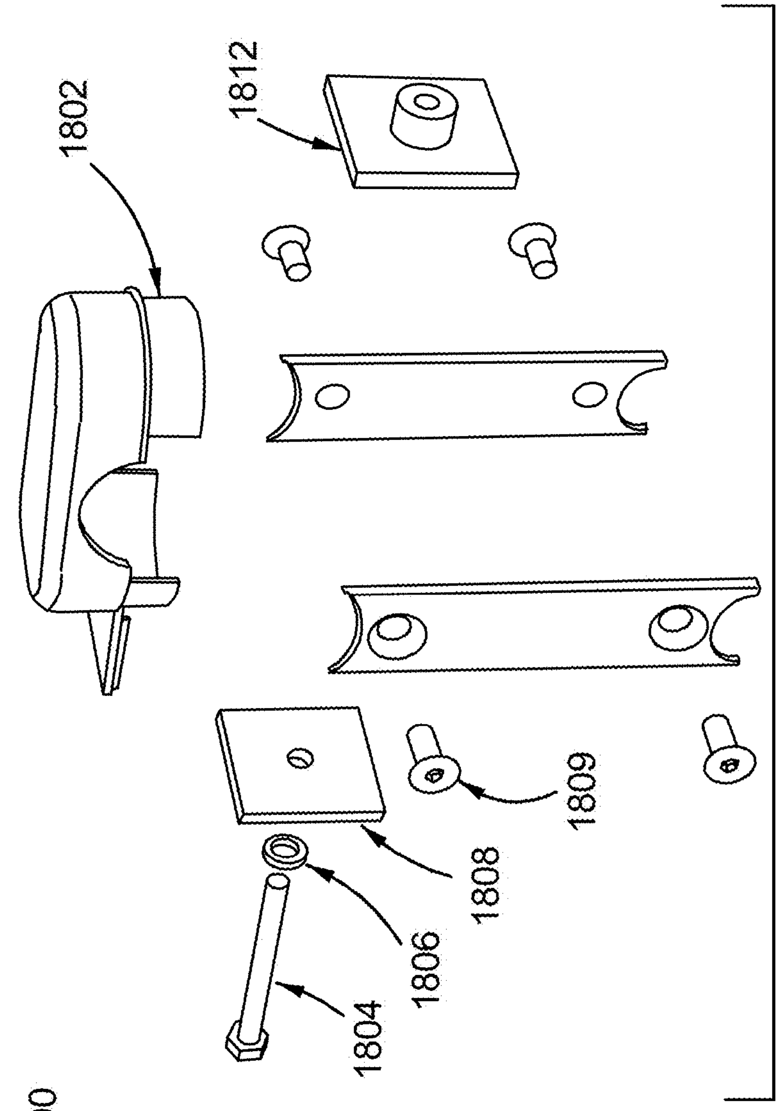
FIG. 31 illustrates an exploded perspective view of the top of the top assembly.
Figure 30:
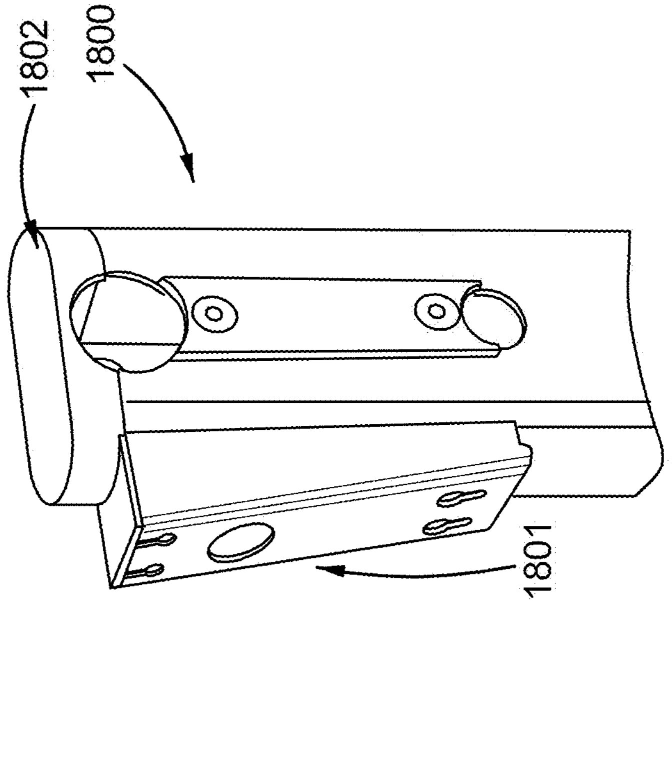
FIG. 30 illustrates a side perspective view of the top of the top assembly.

The top 1800 of the extrusion assembly includes a slot for the mounting of the frame or cage 1706 (FIG. 17). The top of the extrusion assembly is shown in more detail in FIG. 30. The mounting bracket includes lateral and inline clamping parts as shown in exploded perspective in FIG. 31. These are used to support and clamp the cage.

Figure 32:
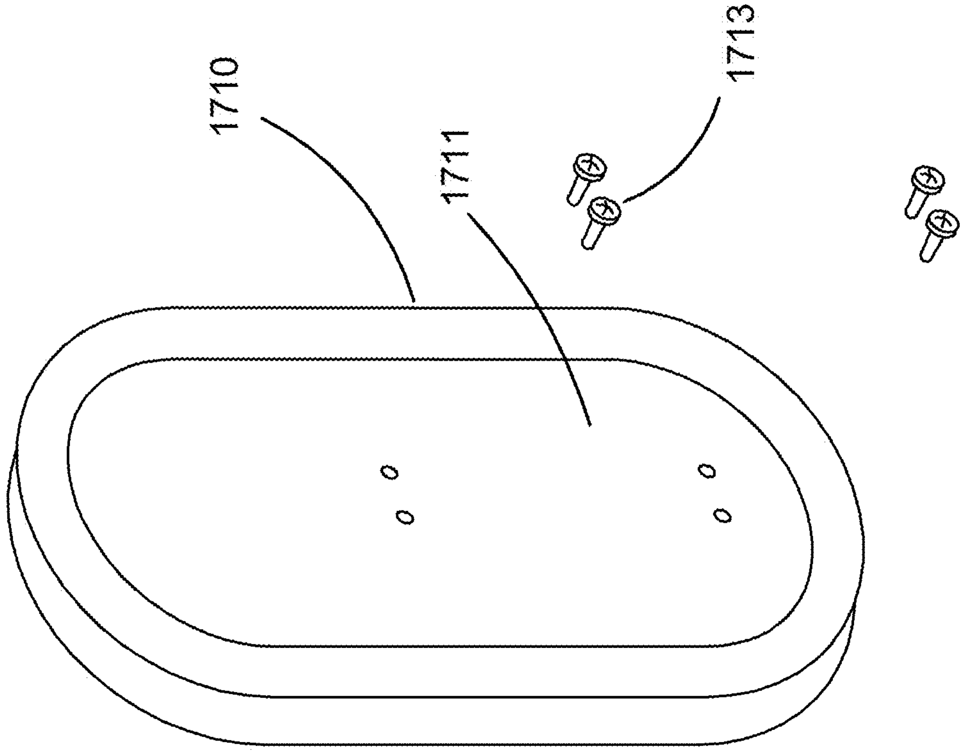
FIG. 32 illustrates a perspective view of the back pad.

Mounted on the end 1801 (FIG. 30) of the top of the extrusion assembly is the back pad 1710. The backpad is shown in more detail in FIG. 32, including back pad chassis 1711 and mounting screws 1713.

Figure 34:
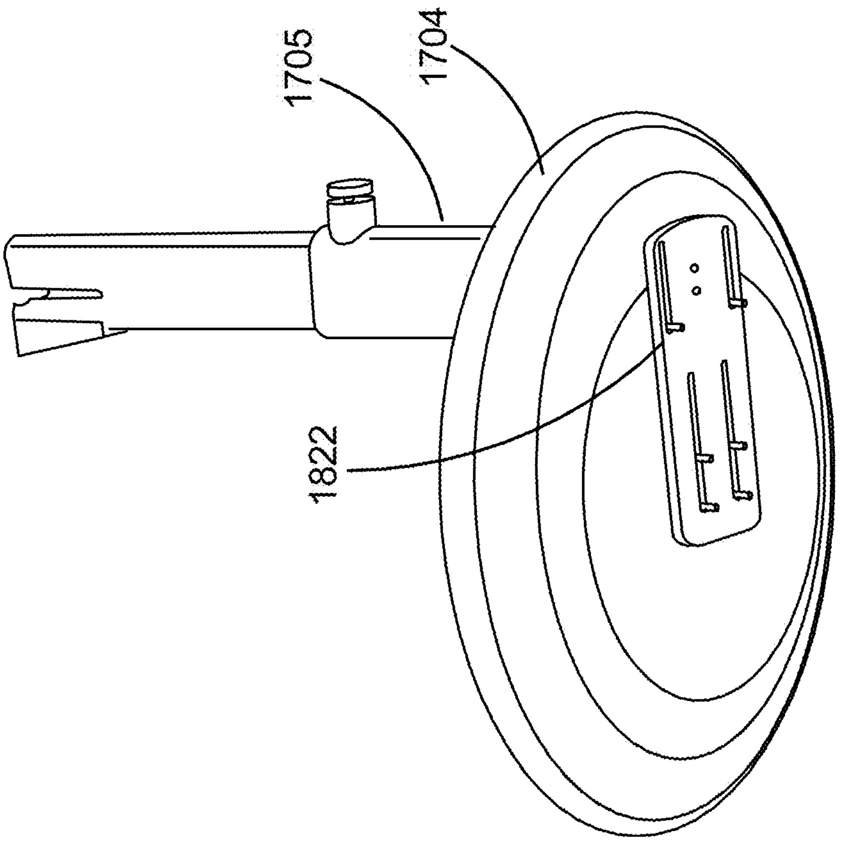
FIG. 34 illustrates a side perspective view of the interconnection of the bottom assembly and platform.
Figure 33:
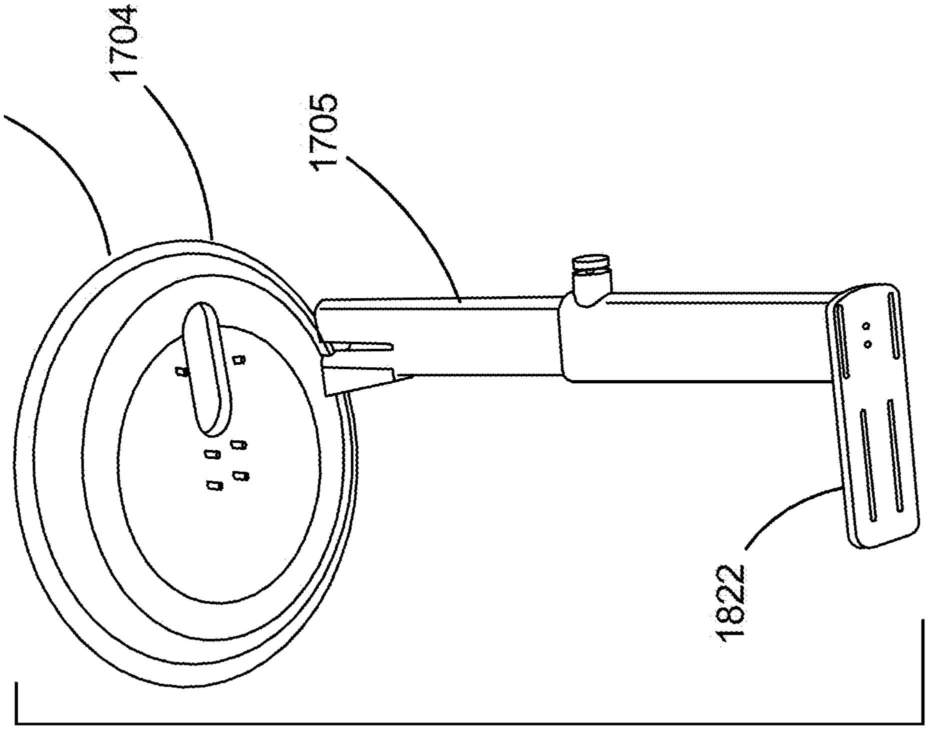
FIG. 33 illustrates a side perspective view of the insertion of the bottom assembly through the platform.

As illustrated in FIG. 33, the stem assembly 1705 is inserted through a slot 1820 in platform 1704 with the plate portion 1822 being bolted to the underside of base 1704 with the result being as illustrated in FIG. 34. The stem assembly can be inserted by taking the pre-assembled Stem and removing the Back Pad, and other parts from the top of the stem. The Stem Assembly is fed through the slot in the Platform or base until the Stem Base Plate locates over the threaded studs of the Platform. The stem is adjusted to the desired position. The initial setting should be fully rearwards as shown in the figures. The stem is secured into place by applying and tightening two M10 Nyloc Nuts on the rear studs.

Figure 36:
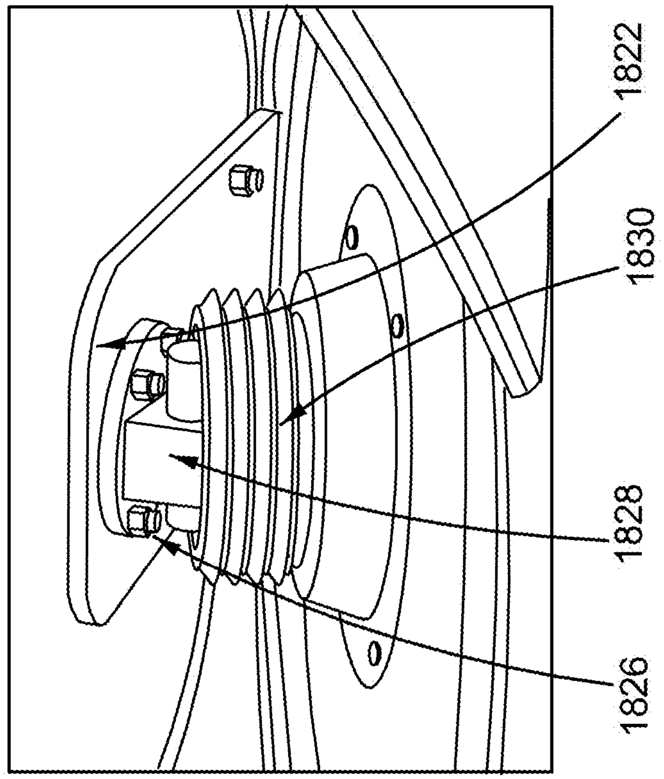
FIG. 36 illustrates a close up view of the attachment of the universal joint.
Figure 35:
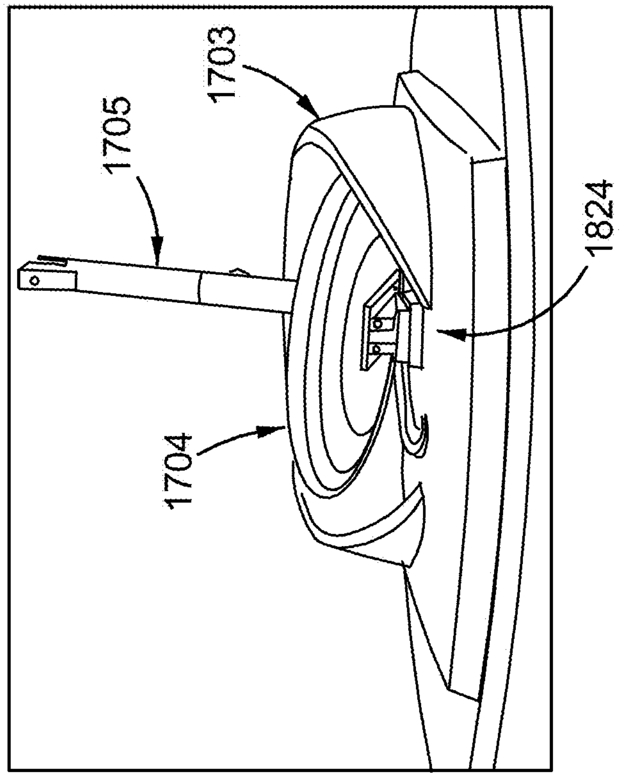
FIG. 35 illustrates a side perspective view of the bottom assembly and platform and base.

Next, as illustrated in FIGS. 35 and 36, the Platform 1704 and Stem 1705 subassembly is connected to the Universal Joint by pushing the Uni Joint Boot down and aligning the four front studs with the holes in the top of the Universal Joint 1824, threading on the 4 OFF 958 M10 Nyloc Nuts onto studs. 3. The Stem is fixed into place by tightening up four nuts 1826 onto the studs using a ring spanner.

Figure 37:
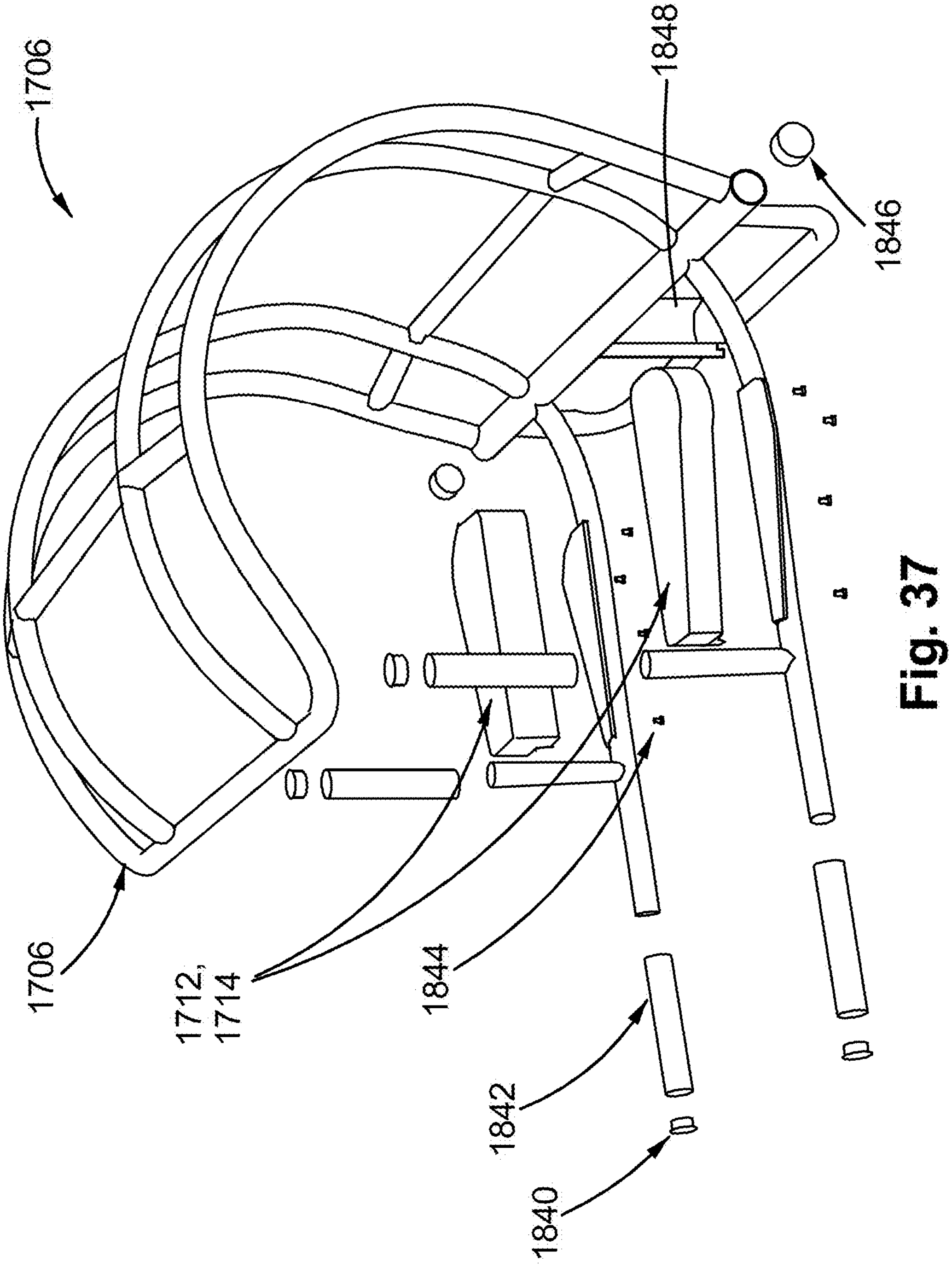
FIG. 37 illustrates a side perspective view in disassembled form of the upper frame assembly.

Next, the upper frame assembly can be formed. An example of the upper frame assembly is shown in FIG. 37 in an exploded perspective view 1706. The upper frame assembly includes caps 1840, handle sleeves 1842, screw e.g. 1844, left and right arm pad assemblies 1712, 1714, guide plate 1848 and large caps 1846.

Figure 38:
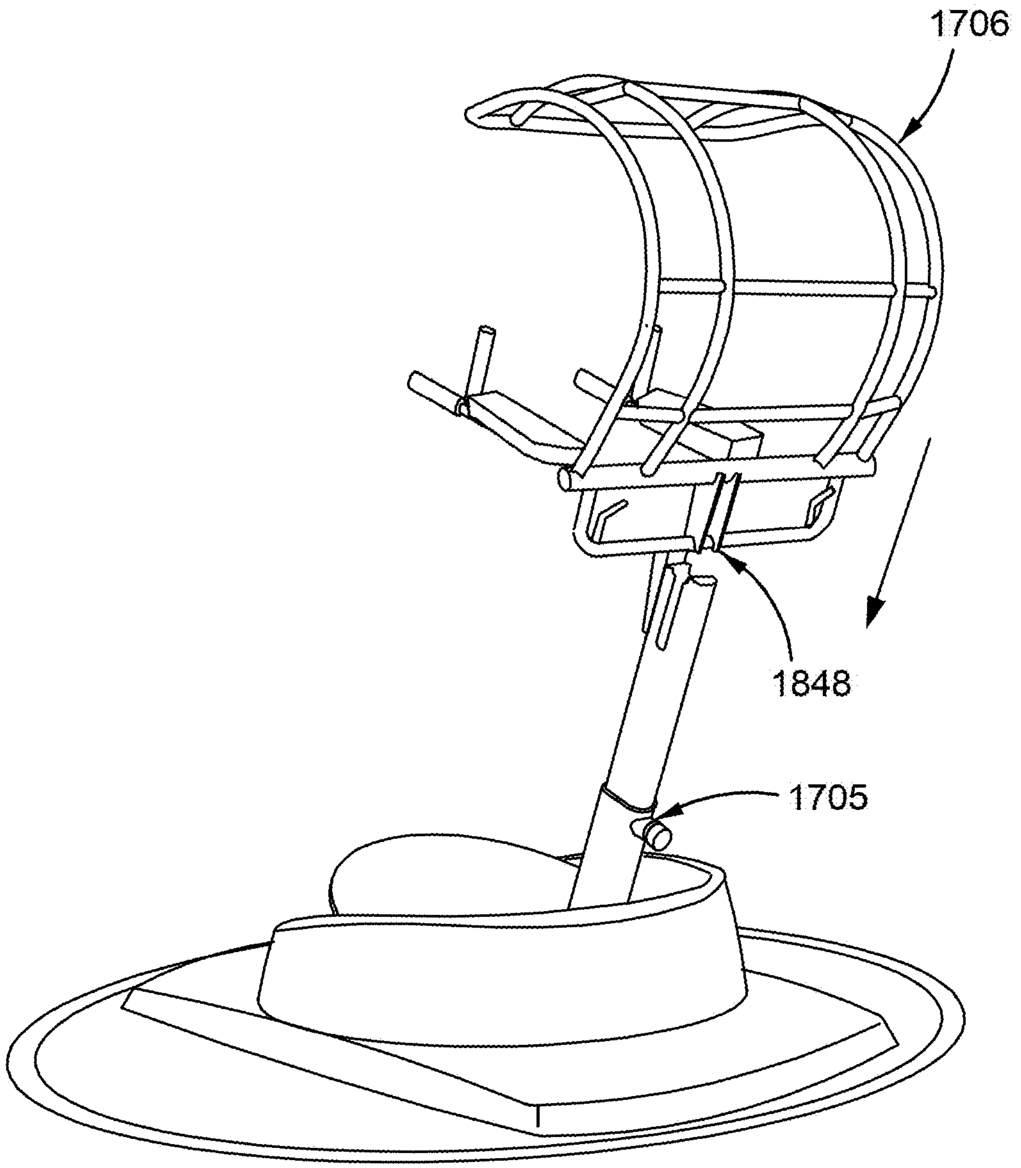
FIG. 38 illustrates a side perspective view of the insertion of the upper frame assembly into the stem assembly.

As shown in FIG. 38, the assembled upper frame assembly 1706 is then mated with the stem assembly 1705 and bolted thereto. This can be done by lifting the frame and sliding the two guide plates into the top of the stem.

Figure 39:
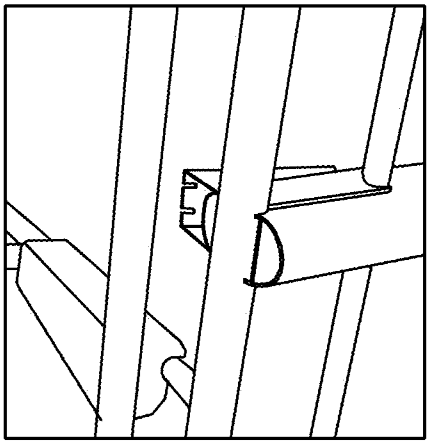
FIG. 39 to FIG. 41 illustrate the attachment of the frame assembly to the stem assembly.
Figure 40:
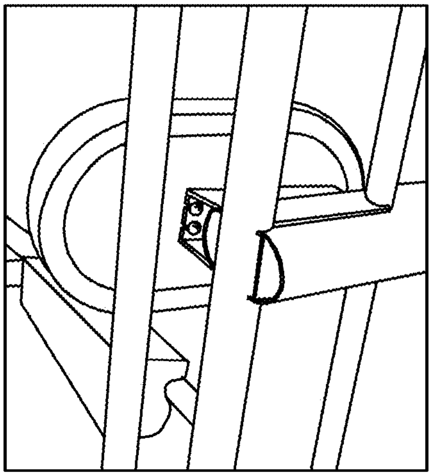
Figure 41:
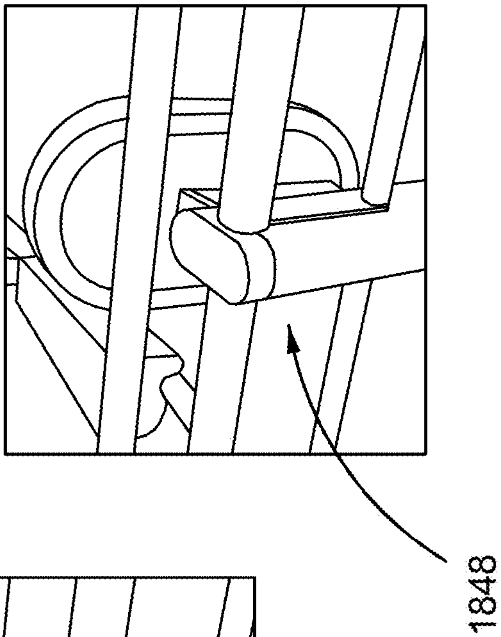

FIG. 39 shows the process of assembling the Lateral and Inline Clamps joining the Frame to the Stem loosely. FIG. 40 shows the assembly of the Back Pad into place. The bottom two screws are adjusted so they slide snuggly into their keyhole slots. The top two screws are firmly tightened. Next, FIG. 41, the tower stem cap 1802 is tapped into place.

Figure 42:
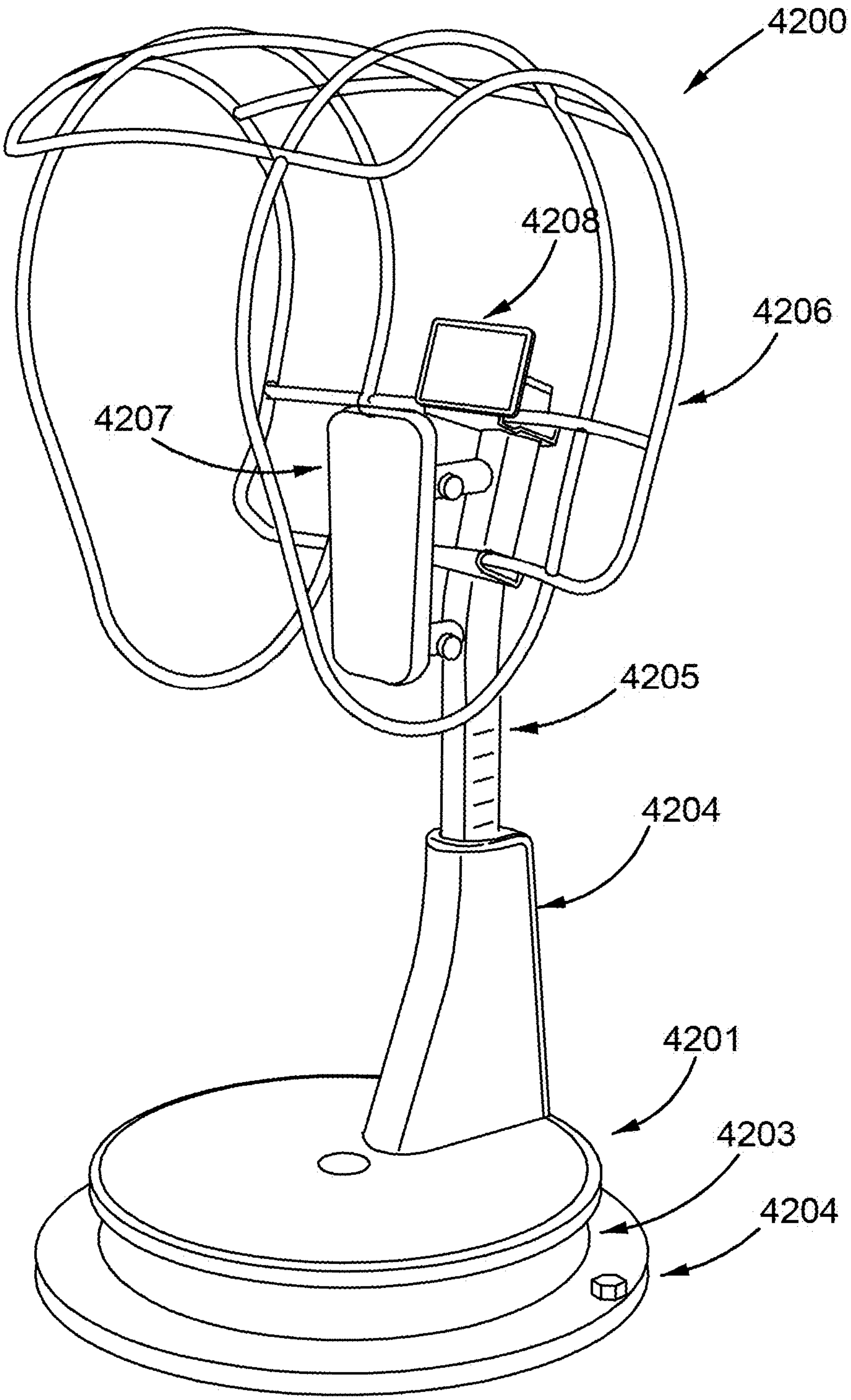
FIG. 42 illustrates a further alternative form of the muscle exercise machine.

Other versions are possible. For example, the rotation of the base may be electrically controlled under the control of a computer device. FIG. 42 illustrates one such device which operates in a similar manner to the previous devices Electrically Controlled Embodiment—EVE Turning to FIG. 42, the electrical version of the exercise machine is shown 4200. This machine includes a platform 4201 on which the user stands, holding a supporting cage 4206 and using backreset 4207 for either back or stomach support. The platform is connected to base 4202 and interposed is a shroud 4203. A lower stem assembly 4204 interconnects an upper stem assembly 4205, which in turn supports the cage 4206. Electronic control is provided by a touch sensitive computer tablet type device 4208. The tablet 4208 provides a series of exercise type programs for activation by the user. The arrangement 4200 is designed to be driven automatically and electrically with the platform undergoing a precession like movement and angled at predetermined degree depending on user settings.

The arrangement 4200 therefore contains to aspect over the manual system. The first is a controlled angle of operation of the platform and the second is the controlled precession of the platform. The implementation of these two additions will now be discussed with reference to the schematic illustrations in FIG. 43 and FIG. 44. In the example embodiment, the angle of inclination of the platform is controlled by a screw drive and the precession motion is controlled by a series of wheel bearings.

Figure 43:
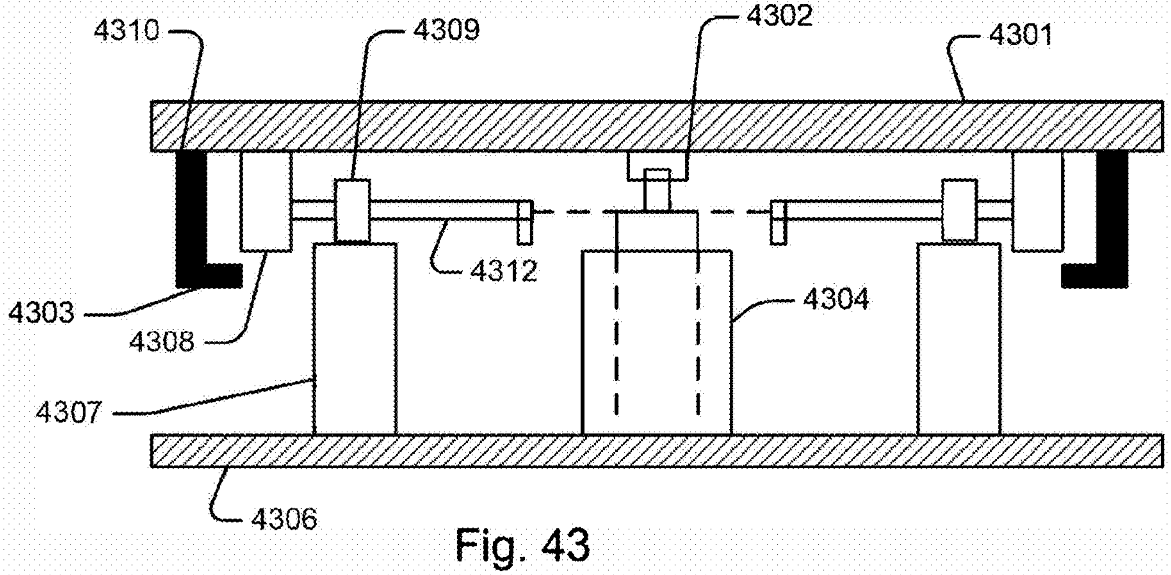
FIG. 43 illustrates a first sectional view through the base of the alternative muscle exercise machine.
Figure 44:
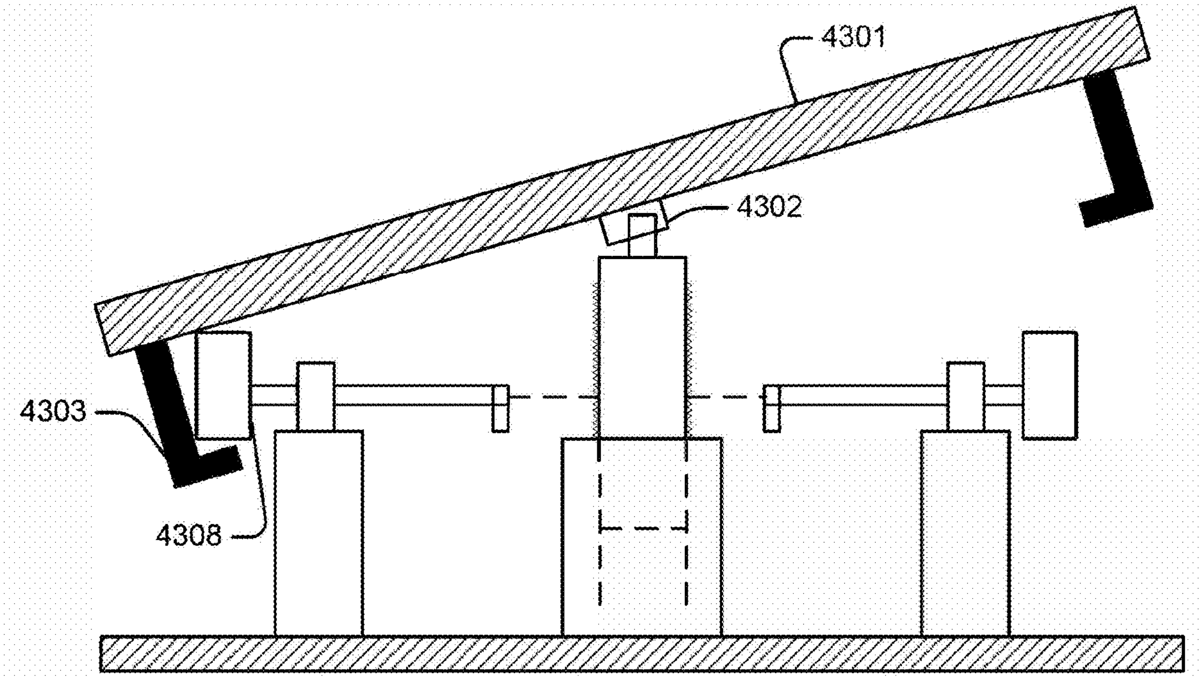
FIG. 44 illustrates a first sectional view through the base of the alternative muscle exercise machine.

As shown in FIG. 43, the platform 4301 is connected to a universal joint 4302 which in turn is mounted on top of a worm drive 4304 which can raise and lower the platform under electrical control. FIG. 43 shows the platform in a lowered state, with FIG. 44 showing the platform in an inclined state after raising of the worm drive 4304.

The platform is also supported by bearings e.g. 4308 which are interconnected to bearings 4309 and rotate on support/guide 4307 and is driven by plater 4312. The plater 4312 rotates under the control of an electric motor drive (not shown) and in turn drives the bearings 4308 and 4309 around on platter 4312, thereby causing the platform 4301 to undergo a precession like motion.

The platform 4301 can include a circumferential lip 4310 and a further perpendicular lip 4303 which engages with the bottom surface of bearing 4308 during operation.

The net effect experienced by the user is a controlled precession at a predetermined inclination, and predetermined precession rate, with most of the user's weight being supported by the universal joint 4392.

Figure 45:
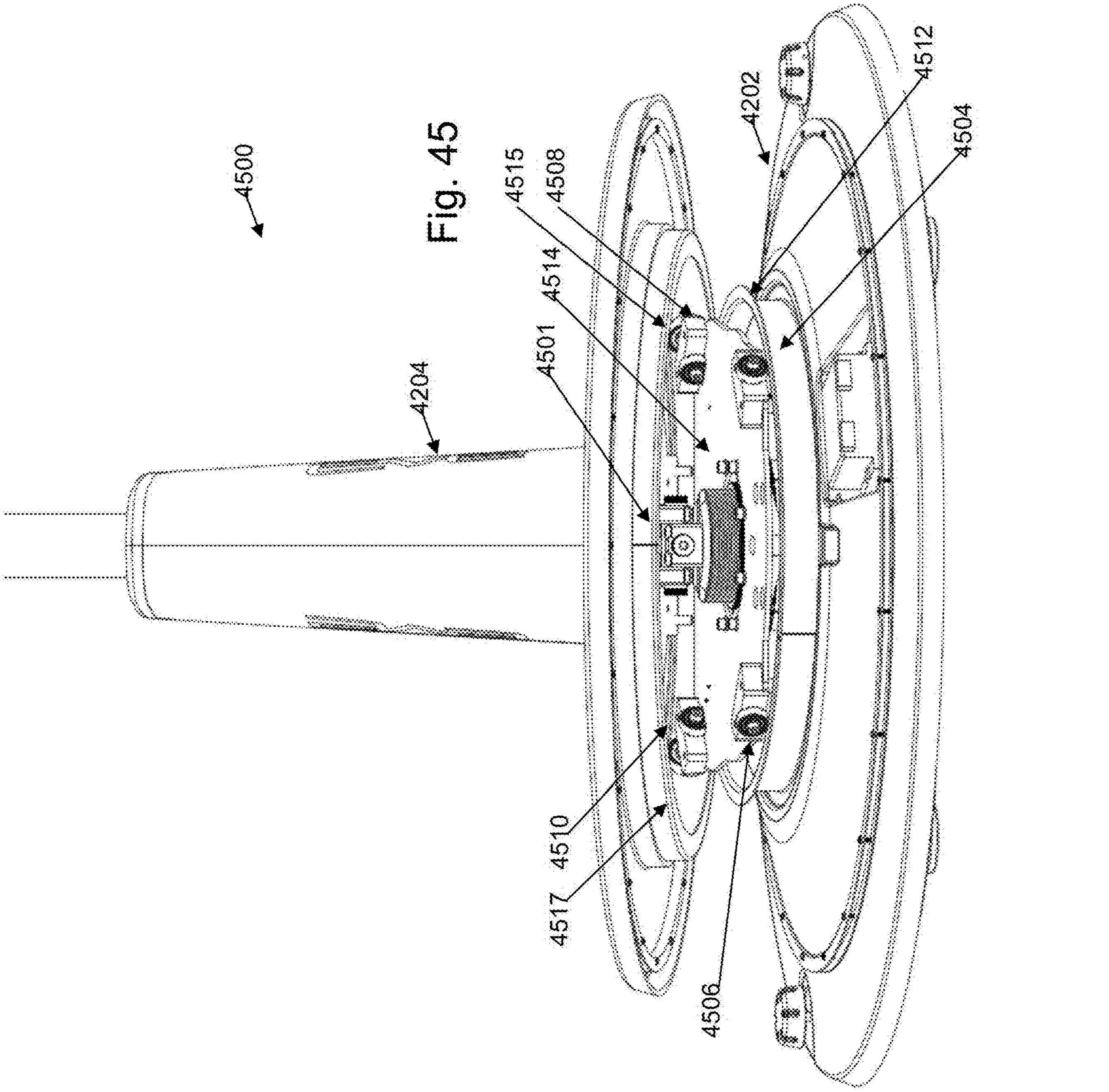
FIG. 45 illustrates a CAD side view of the base portion of the alternative muscle exercise machine.

Turning now to FIG. 45, there is illustrated the first of a series of CAD generated views of the prototype of FIG. 42. The view 4500 is of the prototype in an inclined position, and illustrates the base 4202, platform 4201 and lower assembly 4204. The universal joint 4501 is driven to an elevated position by a worm drive (not shown). The worm drive can in turn be driven by a belt drive.

A platter 4502 is driven by a second belt drive and includes 4 bearing units 4504, 4506, 4508, and 4510. The bearing units run on track 4512. The two bearing units 4506, 4504, support one end of the platter 4514. The two bearing units 4508 and 4510 include a first bearing for support on track 4512, and a second outer bearing which engages with the lip of the rim 4517 so as to couple the platform 4501 to the platter 4514, in conjunction with the universal joint 4501.

Figure 46:
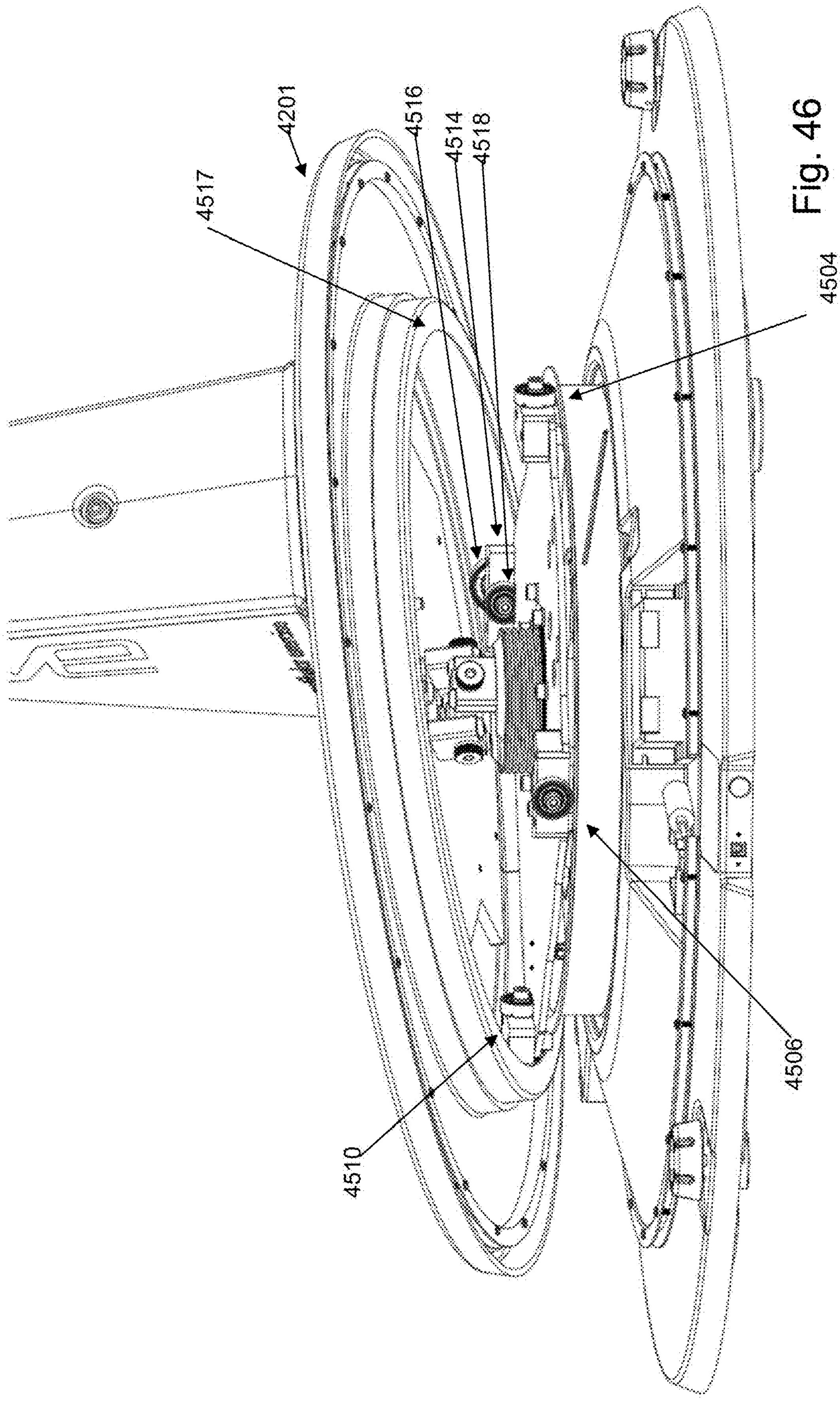
FIG. 46 illustrates a further CAD side view of the base portion of the alternative muscle exercise machine.

Turning to FIG. 46, which shows a CAD generated view of the prototype, again in an inclined position, more clearly showing the bearing unit 4514, which includes inner and outer bearings 4516, 4518, with the inner bearing 4514 engaging with the surface of the support track 4512 and the second bearing engages with the rim 4517.

Figure 47:
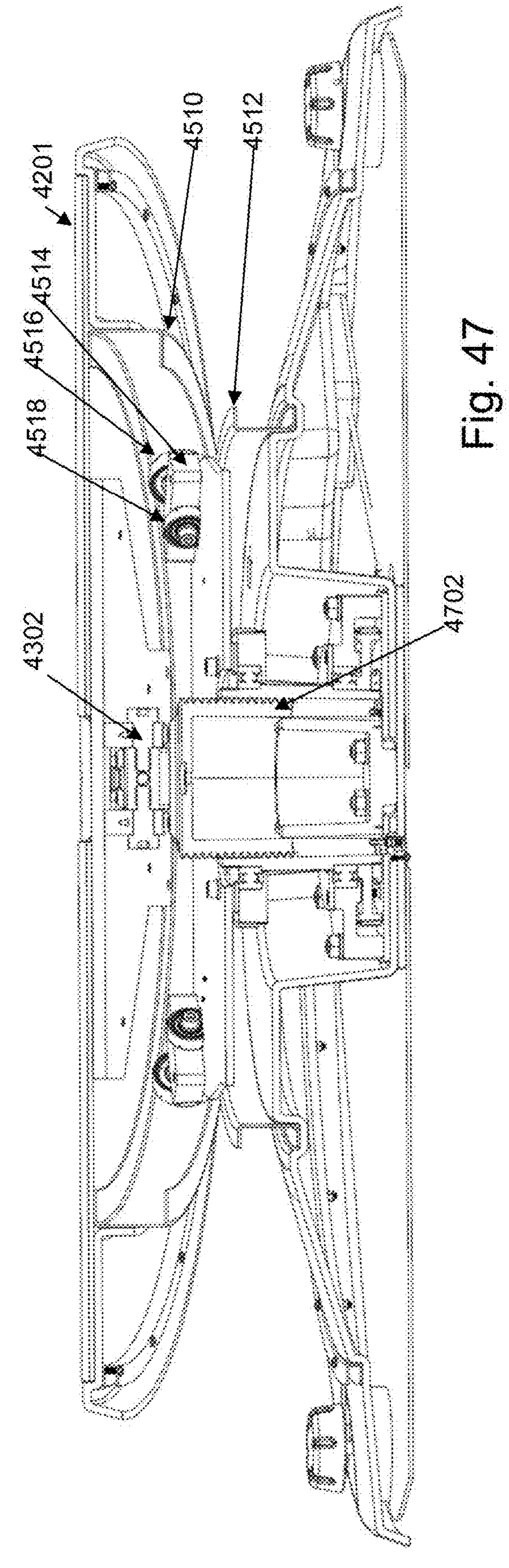
FIG. 47 illustrates a further CAD sectional view of the base portion of the alternative muscle exercise machine.
Figure 48:
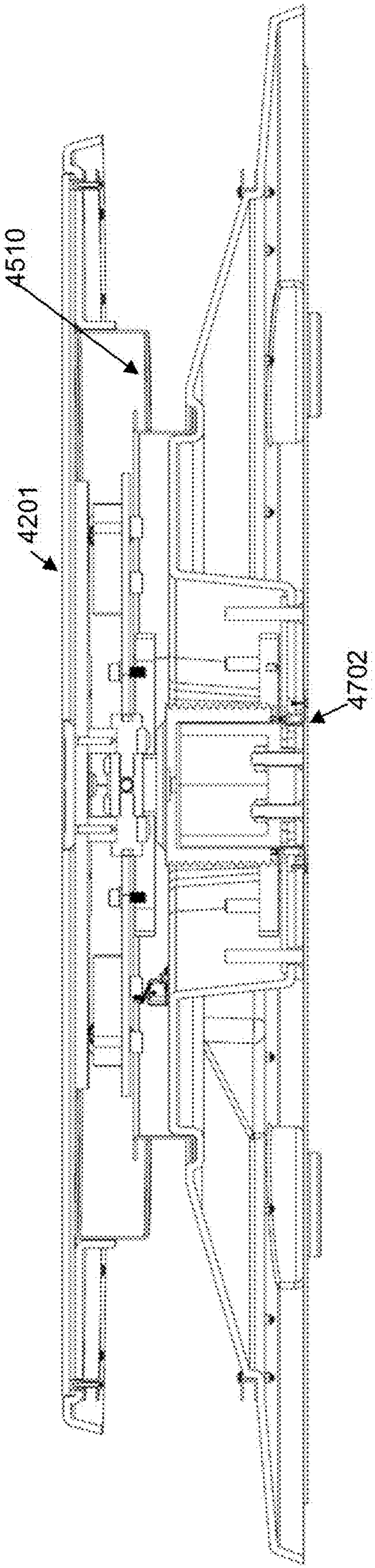
FIG. 48 illustrates a further CAD sectional view of the base portion of the alternative muscle exercise machine.

Turning to FIG. 47, there is illustrated a CAD generated sectional view thorough the base of the prototype, again illustrating teh bearing unit 4514, having inner bearing 4518 and outer bearing 4516, with the inner bearing running along track 4212, and the outer bearing 4516, running along track 4510 of the platform 4201. FIG. 47 also illustrates the inner portions of the worm drive 4702 ultilised in the raising and lowering of the universal joint FIG. 48 illustrates a similar sectional view to FIG. 47. However, in this case the worm drive 4702 has been lowered to its base position and the platform 4201 is also lowered. The bearings engage the lip 4510 to maintain the platform in the lowered position.

Figure 49:
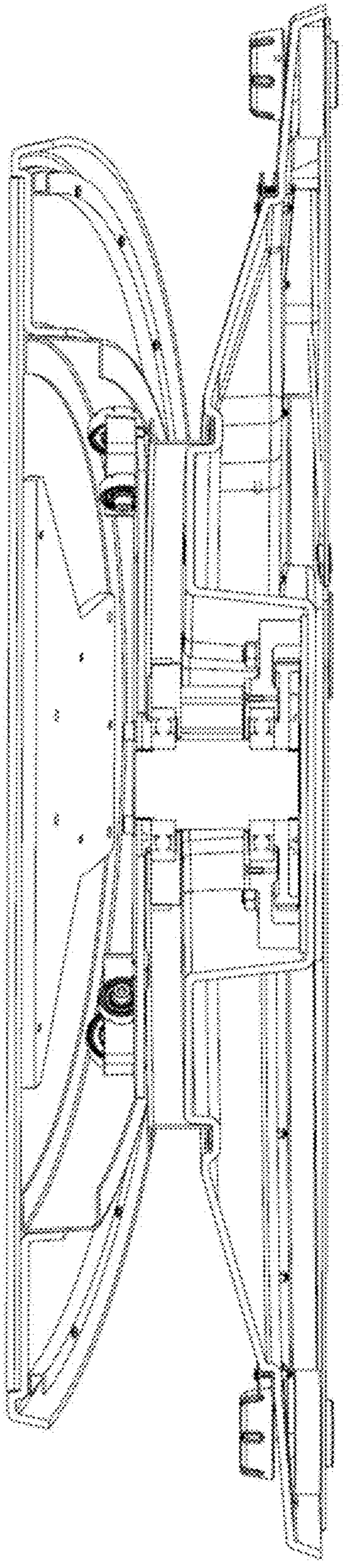
FIG. 49 illustrates a further CAD sectional view of the base portion of the alternative muscle exercise machine.
Figure 50:
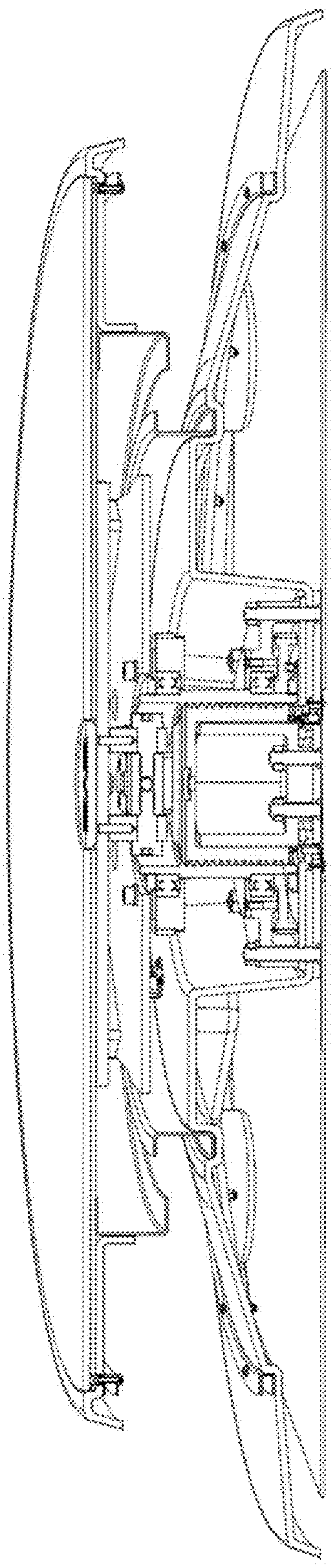
FIG. 50 illustrates a further CAD sectional view of the base portion of the alternative muscle exercise machine.

FIG. 50 illustrates a different sectional view similar to that of FIG. 48. FIG. 49 illustrates a sectional similar to that of FIG. 47.

Figure 51:
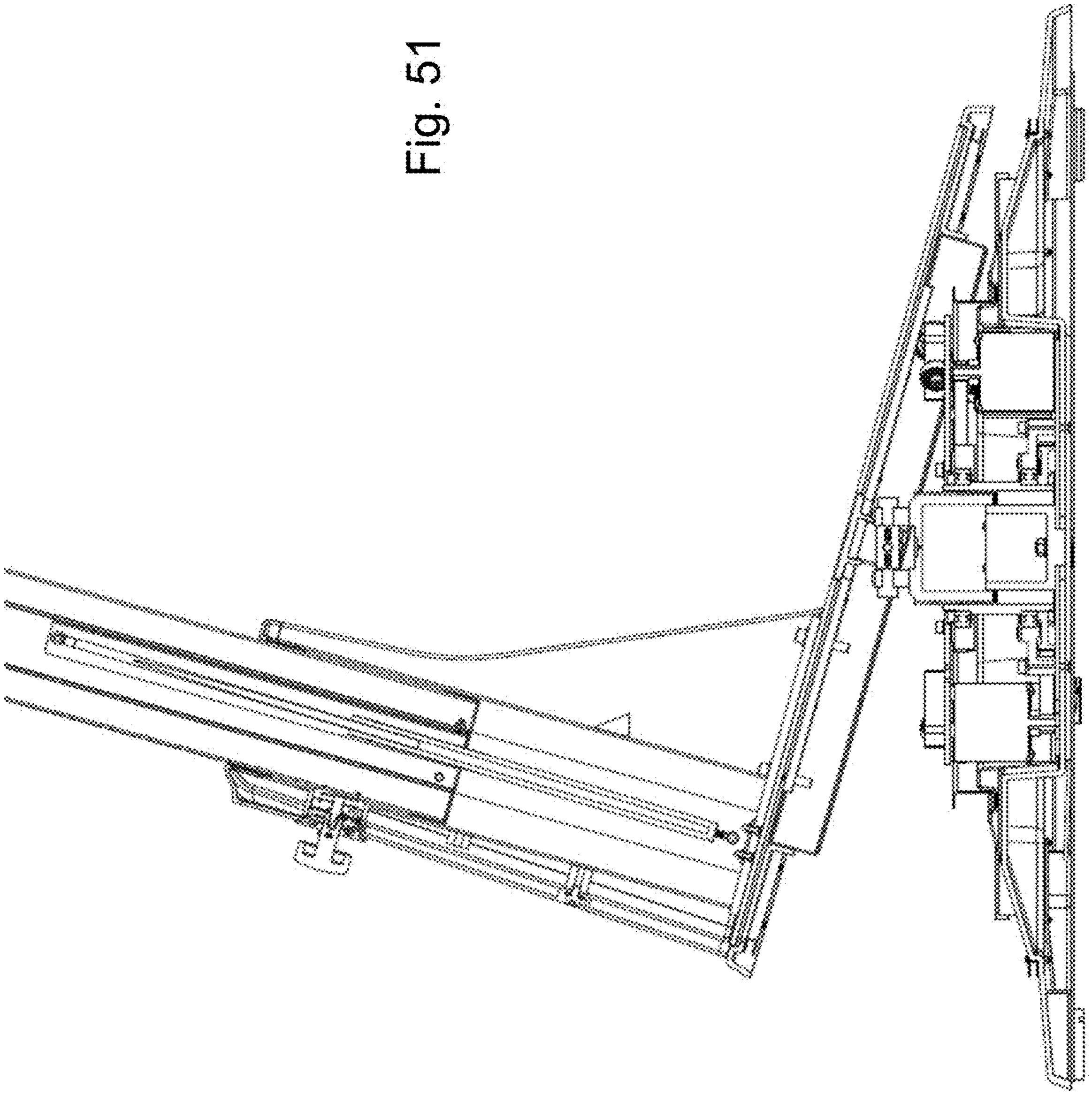
FIG. 51 illustrates a further CAD sectional view of the lower portions of the alternative muscle exercise machine.

Further FIG. 51 illustrates a further sectional view through the base and lower support member.

A number of refinements are possible. For example, the upper cage could include a movable or flexible joint in its connection to the upper assembly. The joint could be motorised to be controlled to synconise with the precession like movement of the platform so as to further enhance movement of the user's upper body.

Unless the context requires otherwise or specifically stated to the contrary, integers, steps or elements of the invention recited herein as singular integers, steps or elements clearly encompass both singular and plural forms of the recited integers, steps or elements.

It will be appreciated that the foregoing description has been given by way of illustrative example of the invention and that all such modifications and variations thereto as would be apparent to persons of skill in the art are deemed to fall within the broad scope and ambit of the invention as herein set forth.

The invention claimed is:

1. A muscle activation system comprising:

an inclined platform for a user to stand on;

a support stem mounted off-center relative to a central point of the inclined platform and substantially perpendicular to the inclined platform, wherein the support stem is adapted to support the user's upper body in a substantially static upright position relative to the inclined platform;

a rigid upper body user support frame coupled with the support stem and adapted to surround and support the upper body of the user standing on, or supported by, the inclined platform, the rigid upper body user support frame undergoing movement with the inclined platform, wherein the rigid upper body user support frame includes:

a back support adapted to support the torso of the user's upper body in the substantially static upright position during movement of the inclined platform; and a plurality of upper limb supports adapted to be held by the user to maintain the torso against the back support in the substantially static upright position; and a base, coupled to the inclined platform via a coupling, said coupling allowing relative orientation motion between the base and the inclined platform, wherein the inclined platform is angled relative to the base during movement of the inclined platform;

the inclined platform adapted to undergo a precession like motion around the central point so as to circumferentially move the user's upper body, when supported by the rigid upper body user support frame, substantially through an arc around the central point with the user's torso being supported by the back support in the substantially upright static position and offset at an angle relative to a vertical axis through the base;

the inclined platform includes a first circumferential rim;

a roller bearing for rolling along the first circumferential rim and the roller bearing being driven around the first circumferential rim in a substantially horizontal plane by a drive motor;

wherein an angle of inclination of the inclined platform is altered by an electric drive raising or lowering a universal joint between the base and the inclined platform.

2. The muscle activation system as claimed in claim 1, further wherein:

the roller bearing acts to guide a portion of the first circumferential rim to which it is engaged in a first substantially horizontal level;

the angle of inclination of the inclined platform thereby being set by the roller bearing acting to guide the portion of the first circumferential rim and the coupling between the base and inclined platform.

3. The muscle activation system as claimed in claim 1 wherein, during operation, the inclined platform is substantially supported by said first circumferential rim and said universal joint.

4. The muscle activation system as claimed in claim 1, wherein said inclined platform is generally planar and a normal axis to the inclined platform undergoes a rotation around the central point.

5. The muscle activation system as claimed in claim 1, wherein said plurality of upper limb supports includes a plurality of hand holds adapted to be held by the user.

6. The muscle activation system as claimed in claim 5, wherein said plurality of upper limb supports further includes lower arm holds adapted to structurally support the user's lower arms.

7. The muscle activation system as claimed in claim 1 further comprising:

an automated platform driving means for driving the inclined platform through its motion.

8. The muscle activation system as claimed in claim 7, wherein said automated platform driving means comprises an electric motor interconnected to a rotational plate having a series of circumferential bearings which engage with the inclined platform to drive the motion of the inclined platform.

9. The muscle activation system as claimed in claim 1, wherein the inclined platform does not substantially rotate around the vertical axis during operation.

10. The muscle activation system as claimed in claim 1, wherein the user's torso is secured to the back support in the substantially static upright position.

11. The muscle activation system as claimed in claim 10 wherein the rigid upper body user support frame is adapted to receive at least one strap for securing the user's torso to the back support.

12. The muscle activation system as claimed in claim 1, wherein the support stem is mounted on an outer edge of the inclined platform.

* * * * *